US009368118B2

(12) United States Patent
Harada et al.

(10) Patent No.: US 9,368,118 B2
(45) Date of Patent: Jun. 14, 2016

(54) VOICE ANALYZER, VOICE ANALYSIS SYSTEM, AND NON-TRANSITORY COMPUTER READABLE MEDIUM STORING PROGRAM

(71) Applicant: FUJI XEROX CO., LTD., Tokyo (JP)

(72) Inventors: Haruo Harada, Kanagawa (JP); Yohei Nishino, Kanagawa (JP); Kiyoshi Iida, Kanagawa (JP); Kei Shimotani, Kanagawa (JP); Hirohito Yoneyama, Kanagawa (JP); Akira Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 333 days.

(21) Appl. No.: 13/777,432

(22) Filed: Feb. 26, 2013

(65) Prior Publication Data

US 2014/0088966 A1 Mar. 27, 2014

(30) Foreign Application Priority Data

Sep. 25, 2012 (JP) .................................. 2012-211177

(51) Int. Cl.
*G10L 17/00* (2013.01)
*G10L 25/78* (2013.01)
*G10L 25/03* (2013.01)
*G01S 11/14* (2006.01)

(52) U.S. Cl.
CPC ................. *G10L 17/00* (2013.01); *G01S 11/14* (2013.01); *G10L 25/03* (2013.01); *G10L 25/78* (2013.01)

(58) Field of Classification Search
CPC ........... G10L 21/02; G10L 17/00; G01S 3/80; G01S 11/14
See application file for complete search history.

(56) References Cited

U.S. PATENT DOCUMENTS

| 9,170,325 | B2 * | 10/2015 | Zhang ..................... G01S 11/14 |
| 2009/0037179 | A1 * | 2/2009 | Liu et al. ........................ 704/260 |
| 2009/0243932 | A1 * | 10/2009 | Moshfeghi ..................... 342/378 |
| 2010/0211387 | A1 * | 8/2010 | Chen ...................... G10L 25/78 704/226 |
| 2010/0214086 | A1 * | 8/2010 | Yoshizawa et al. ............ 340/435 |
| 2010/0272270 | A1 * | 10/2010 | Chaikin et al. .................. 381/59 |
| 2011/0106533 | A1 * | 5/2011 | Yu ................................. 704/233 |
| 2011/0161074 | A1 * | 6/2011 | Pance et al. .................... 704/201 |
| 2011/0295603 | A1 * | 12/2011 | Meisel ........................... 704/246 |

FOREIGN PATENT DOCUMENTS

| JP | A-06-186328 | 7/1994 |
| JP | A-2010-283676 | 12/2010 |
| JP | A-2011-205324 | 10/2011 |

* cited by examiner

*Primary Examiner* — Shreyans Patel
(74) *Attorney, Agent, or Firm* — Oliff PLC

(57) ABSTRACT

A voice analyzer includes a voice information acquiring unit that acquires information about voices acquired by a first voice acquiring unit which acquires the voice and is worn by a first wearer and a second voice acquiring unit which acquires the voice and is worn by a second wearer from each of the wearers, and a distance calculation unit that calculates a distance between the first wearer and the second wearer on the basis of (a) speaker identification information, which is information for determining whether the voice acquired by the first voice acquiring unit and the voice which is the same as that acquired by the first voice acquiring unit and is acquired by the second voice acquiring unit are spoken by the wearers or other persons, and (b) a phase difference between sound waves with plural frequencies included in the voices.

16 Claims, 18 Drawing Sheets

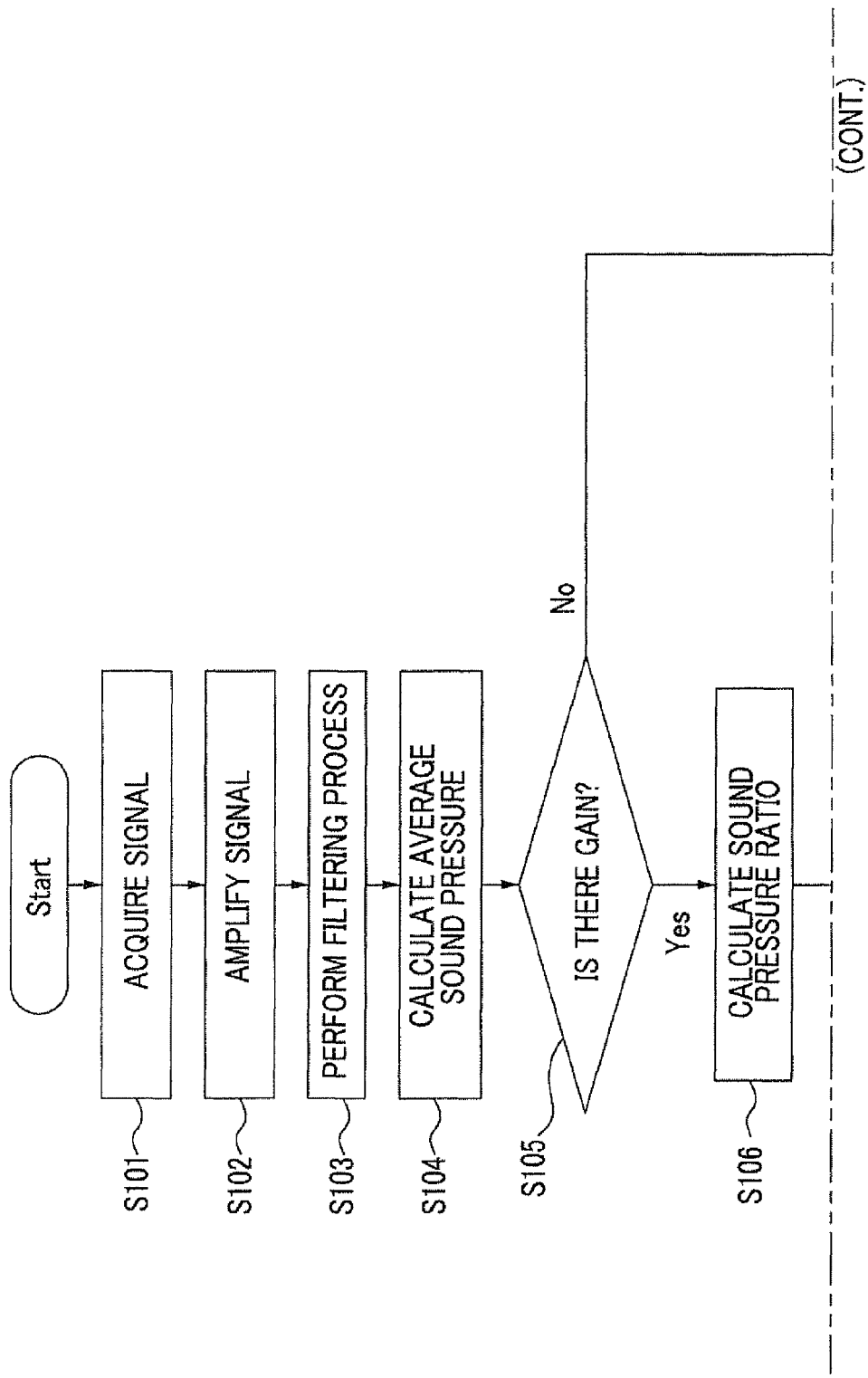

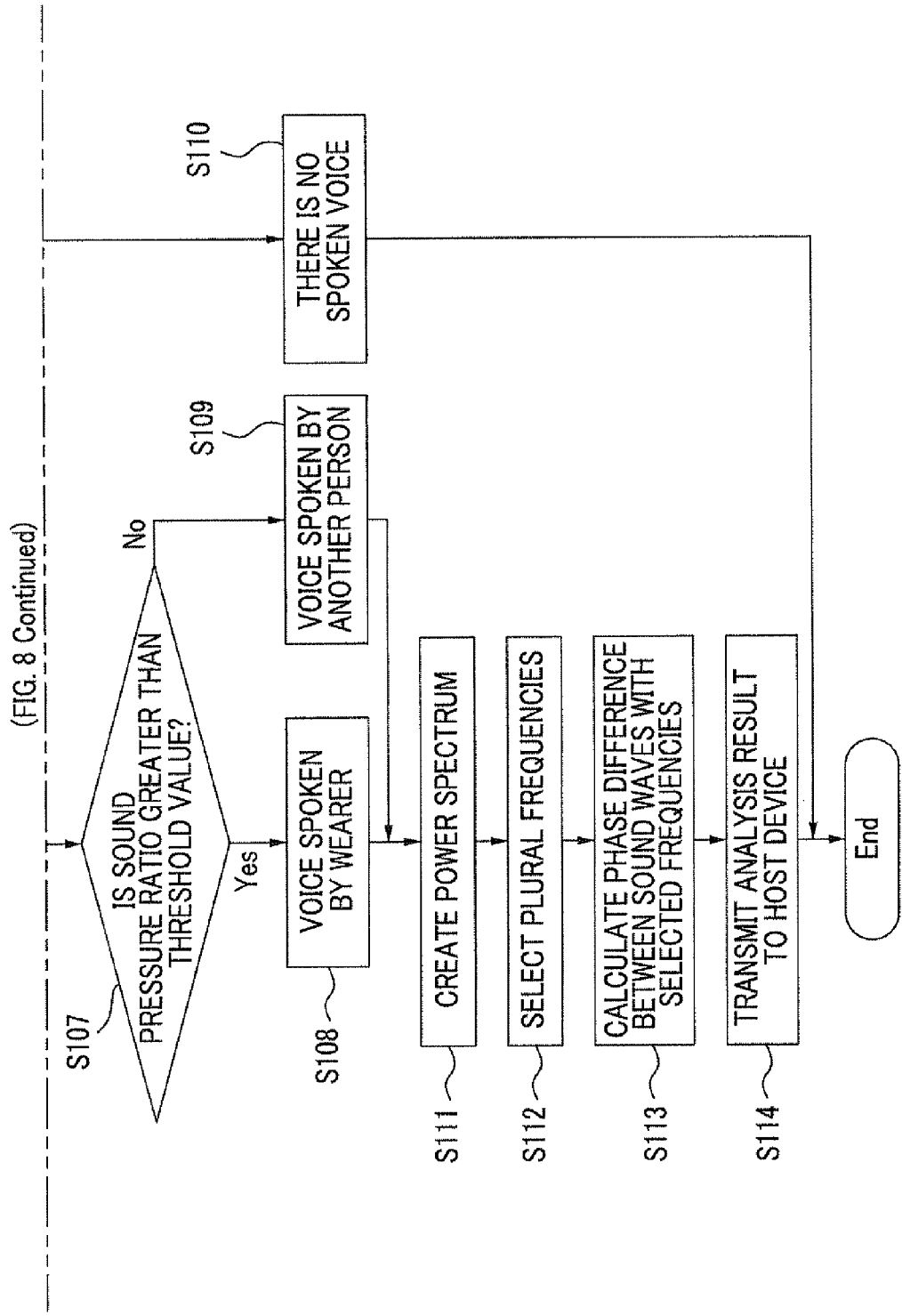

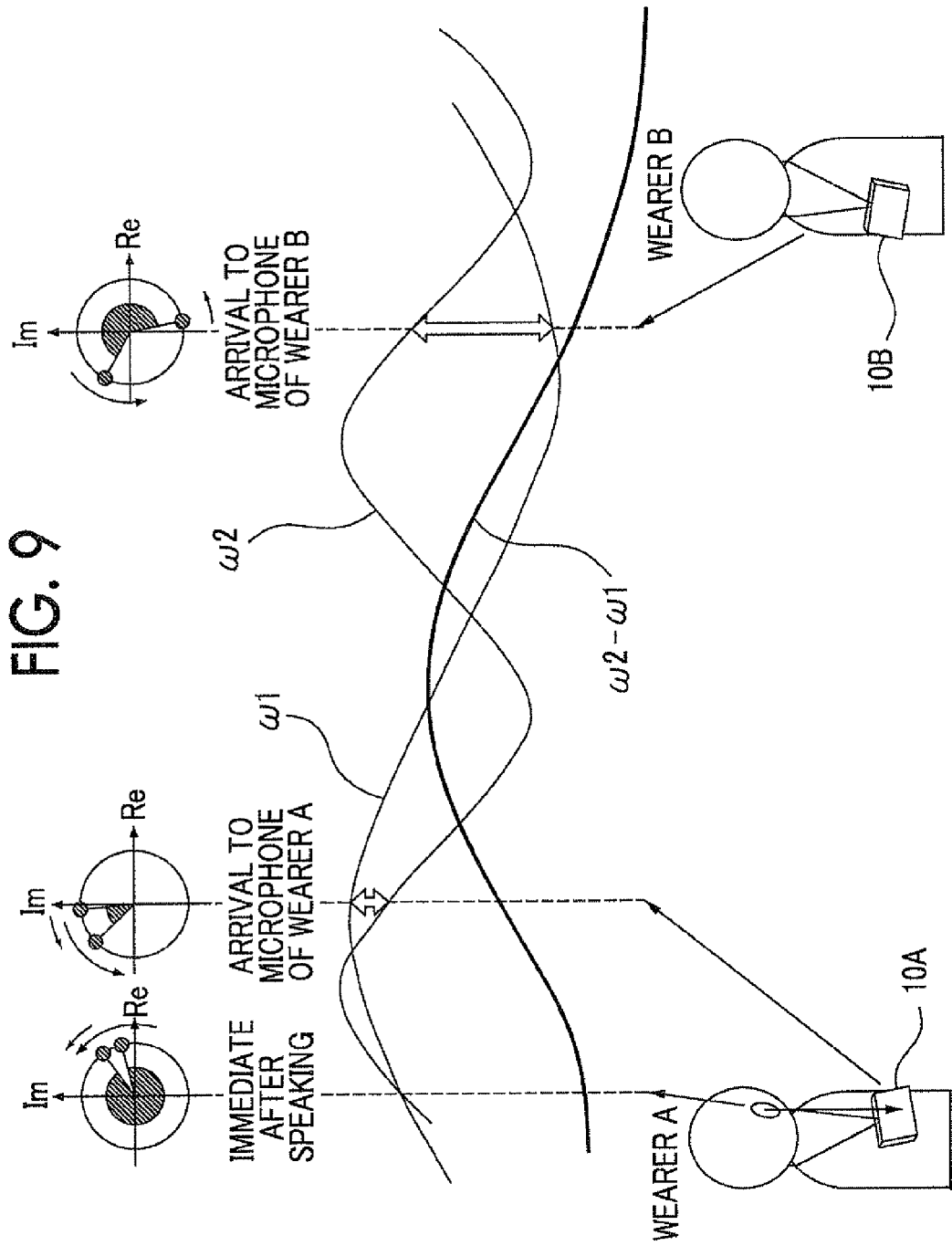

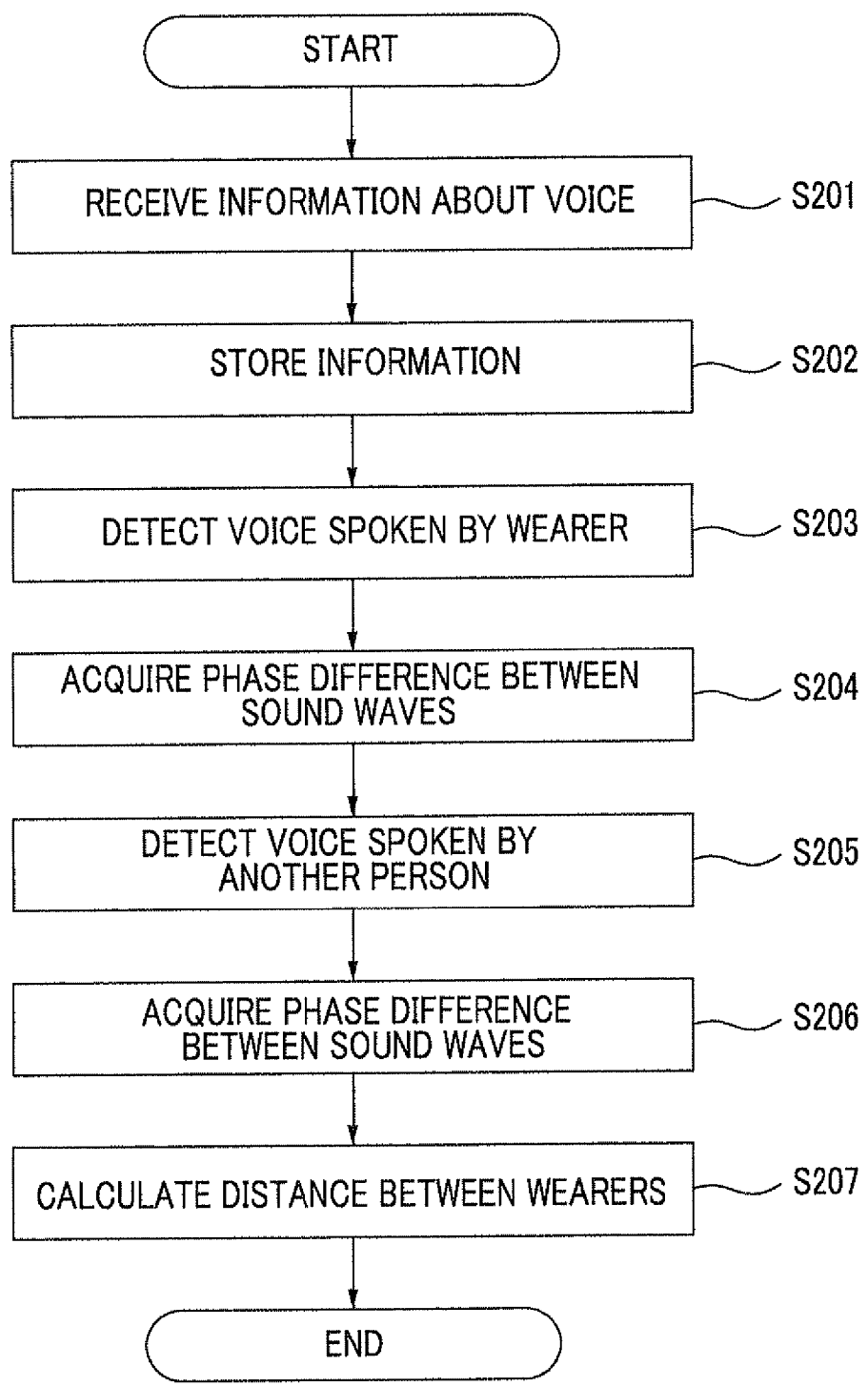

VOICE ANALYZER, VOICE ANALYSIS SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2012-211177 filed Sep. 25, 2012.

BACKGROUND

Technical Field

The present invention relates to a voice analyzer, a voice analysis system, and a non-transitory computer readable medium storing a program.

SUMMARY

According to an aspect of the invention, there is provided a voice analyzer including: a voice information acquiring unit that acquires information about voices acquired by a first voice acquiring unit which acquires the voice and is worn by a first wearer and a second voice acquiring unit which acquires the voice and is worn by a second wearer from each of the wearers; and a distance calculation unit that calculates a distance between the first wearer and the second wearer on the basis of (a) speaker identification information, which is information for determining whether the voice acquired by the first voice acquiring unit and the voice which is the same as that acquired by the first voice acquiring unit and is acquired by the second voice acquiring unit are spoken by the wearers or other persons, and (b) a phase difference between sound waves with plural frequencies included in the voices.

BRIEF DESCRIPTION OF THE DRAWINGS

Exemplary embodiments of the present invention will be described in detail based on the following figures, wherein:

FIG. 8 is a flowchart illustrating the operation of the terminal device according to this exemplary embodiment;

FIG. 9 is a diagram illustrating a method of calculating the distance between two wearers when the two wearers talk with each other;

FIG. 10 is a flowchart illustrating the operation of a host device according to this exemplary embodiment;

DETAILED DESCRIPTION

Example of Structure of System

Figure 1:
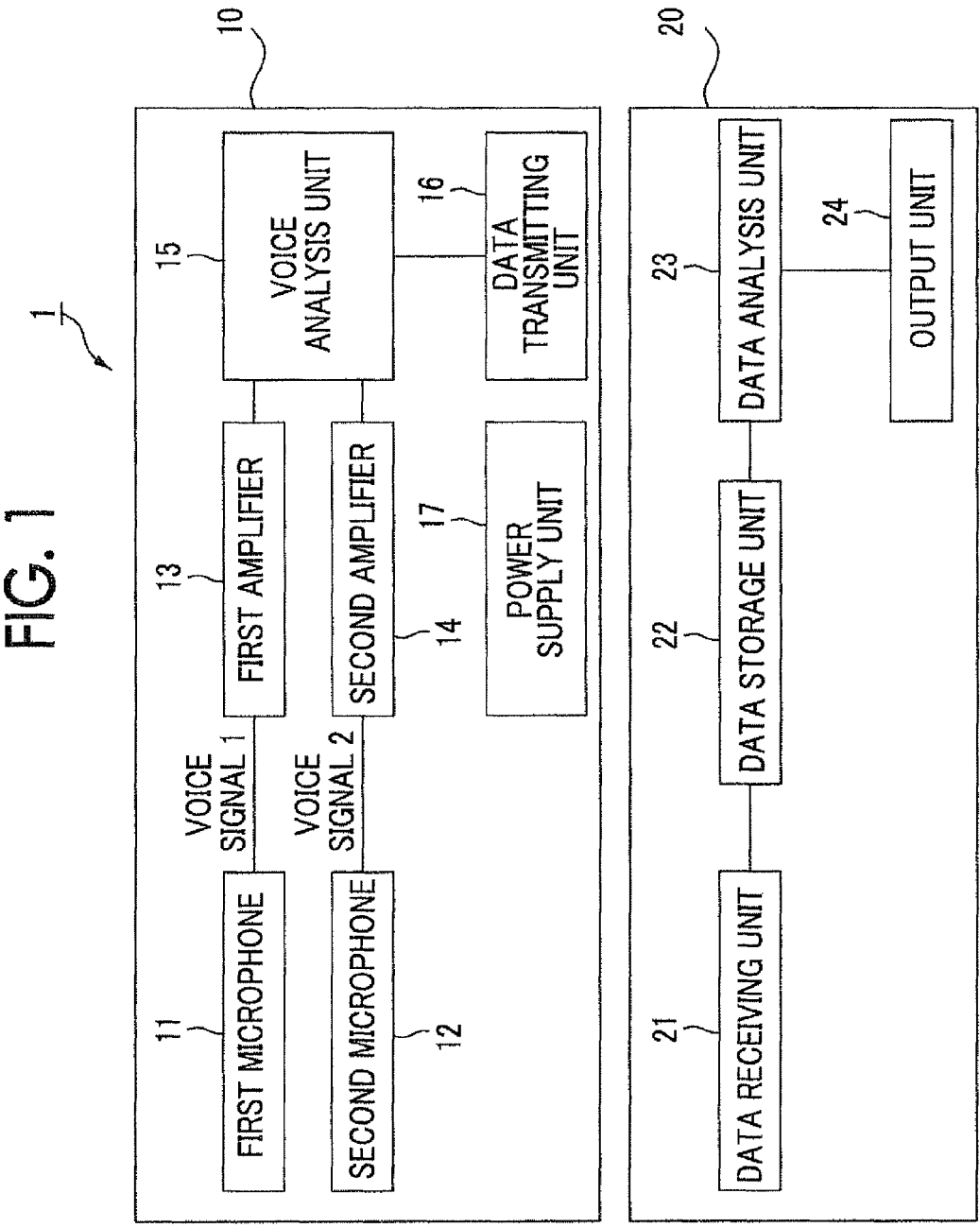
FIG. 1 is a diagram illustrating an example of the structure of a voice analysis system according to an exemplary embodiment.

FIG. 1 is a diagram illustrating an example of the structure of a voice analysis system according to an exemplary embodiment.

As shown in FIG. 1, a voice analysis system 1 according to this exemplary embodiment includes a terminal device 10, which is an example of a voice analyzer, and a host device 20, which is an example of the voice analyzer. The terminal device 10 and the host device 20 are connected to each other through a wireless communication line. For example, a line of the known wireless communication system, such as a Wi-Fi (Wireless Fidelity) (registered trademark) system, a Bluetooth (registered trademark) system, a ZigBee (registered trademark) system, or a UWB (Ultra Wideband) system, may be used as the wireless communication line. In the example shown in FIG. 1, only one terminal device 10 is provided. However, in practice, each user wears and uses the terminal device 10 and the terminal devices 10 corresponding to the number of users are prepared, which will be described in detail below. Hereinafter, the user who wears the terminal device 10 is referred to as a wearer.

The terminal device 10 includes plural microphones (a first microphone 11 and a second microphone 12) which acquire a voice and function as voice acquiring units worn by the wearer and amplifiers (a first amplifier 13 and a second amplifier 14). In addition, the terminal device 10 includes a voice analysis unit 15 which analyzes the acquired voice, a data transmitting unit 16 which transmits the analysis result to the host device 20, and a power supply unit 17.

The first microphone 11 and the second microphone 12 (in some cases, the first microphone 11 and the second microphone 12 are referred to as the microphones 11 and 12 when the first microphone 11 and the second microphone 12 are not distinguished from each other) are positioned at different distances from the mouth (speaking part) of the wearer. In this exemplary embodiment, the first microphone 11 is arranged at a position (for example, about 35 cm) distant from the mouth (speaking part) of the wearer and the second microphone 12 is arranged at a position (for example, about 10 cm) close to the mouth (speaking part) of the wearer. The existing types of microphones, such dynamic-type microphones and condenser-type microphones, may be used as the microphones 11 and 12 according to this exemplary embodiment.

In particular, a non-directional MEMS (Micro Electra Mechanical Systems) microphone is preferable.

The first amplifier 13 and the second amplifier 14 amplify electric signals (voice signals) which are output according to the voices acquired by the first microphone 11 and the second microphone 12. The existing operational amplifiers may be used as the first amplifier 13 and the second amplifier 14 according to this exemplary embodiment.

The voice analysis unit 15 analyzes the voice signals output from the first amplifier 13 and the second amplifier 14. Then, the voice analysis unit 15 determines whether the voice acquired by the first microphone 11 and the second microphone 12 is spoken by the wearer of the terminal device 10 or another person. In addition, the voice analysis unit 15 calculates a phase difference between sound waves with plural frequencies included in the voice. The voice analysis unit 15 functions as a speaker identification unit that determines whether the voice acquired by the microphones 11 and 12 is spoken by the wearer or a person other than the wearer, which will be described in detail below. In addition, the voice analysis unit 15 functions as a phase difference calculation unit that calculates the phase difference between the sound waves with plural frequencies which are included in the voice acquired by the microphones 11 and 12.

The data transmitting unit 16 transmits a terminal ID and the acquired data including the analysis result of the voice analysis unit 15 to the host device 20 through the wireless communication line. Examples of the information to be transmitted to the host device 20 may include information about the time when the first microphone 11 and the second microphone 12 acquire the voice and the sound pressure of the acquired voice, in addition to the analysis result, according to the content of the process of the host device 20. In addition, a data storage unit which stores the analysis result of the voice analysis unit 15 may be provided in the terminal device 10 and data which is stored for a predetermined period of time may be collectively transmitted. The data may be transmitted through a wired line. In this exemplary embodiment, the data transmitting unit 16 functions as a voice information transmitting unit that transmits information about the voice including information about speaker identification (speaker identification information) from the speaker identification unit and information about the phase difference calculated by the phase difference calculation unit.

The power supply unit 17 supplies power to the first microphone 11, the second microphone 12, the first amplifier 13, the second amplifier 14, the voice analysis unit 15, and the data transmitting unit 16. The existing power supply unit, such as a dry battery or a charging battery, is used as the power supply unit. In addition, the power supply unit 17 includes the known circuits, such as a voltage conversion circuit and a charging control circuit, if necessary.

The host device 20 includes a data receiving unit 21 which receives data transmitted from the terminal device 10, a data storage unit 22 which stores the received data, a data analysis unit 23 which analyzes the stored data, and an output unit 24 which outputs the analysis result. The host device 20 is implemented by, for example, an information processing device such as a personal computer. As described above, in this exemplary embodiment, plural terminal devices 10 are used and the host device 20 receives data from each of the plural terminal devices 10.

The data receiving unit 21 corresponds to the wireless line, receives data from each of the terminal devices 10, and transmits the received data to the data storage unit 22. In this exemplary embodiment, the data receiving unit 21 functions as a voice information acquiring unit that acquires information about the voice acquired by the microphones 11 and 12 which acquire voices and are worn by a first wearer and information about the voice acquired by the microphones 11 and 12 which acquire voices and are worn by a second wearer from each of the wearers, which will be described in detail below. The data storage unit 22 is implemented by, for example, a storage device, such as a magnetic disk device of the personal computer, and stores the received data acquired from the data receiving unit 21 according to speakers. In this exemplary embodiment, the speaker is identified by comparing the terminal ID transmitted from the terminal device 10 with speaker information and the terminal ID which are registered in the host device 20 in advance. In addition, the terminal device 10 may transmit wearer information, such as the name of the wearer, instead of the terminal ID.

The data analysis unit 23 is implemented by, for example, a CPU which is controlled by programs of the personal computer and analyzes the data stored in the data storage unit 22. The detailed analysis content and analysis method are changed in various ways depending on the purpose or aspect of use of the system according to this exemplary embodiment. For example, the data analysis unit 23 analyzes the frequency of the conversation between the wearers of the terminal devices 10 or the tendency of the conversation partner of each wearer, or analogizes the relationship with the person which talks with the wearer from information about the length or sound pressure of each speech during conversation. In this exemplary embodiment, the data analysis unit 23 functions as a distance calculation unit that calculates the distance between the first wearer and the second wearer on the basis of the speaker identification information, which is information for determining whether the voice which is acquired by the microphones 11 and 12 worn by the first wearer and the voice which is the same as that acquired by the microphones 11 and 12 worn by the first wearer and is acquired by the microphones 11 and 12 worn by the second wearer are spoken by the wearers or other persons, and the phase difference between the sound waves with plural frequencies included in the voices, which will be described in detail below.

The output unit 24 outputs the analysis result of the data analysis unit 23 or outputs data based on the analysis result. As means for outputting the analysis result, various kinds of means, such as the display of the analysis result, the printing of the analysis result by a printer, and a voice output, may be used according to the purpose or aspect of use of the system and the content or form of the analysis result.

Example of Structure of Terminal Device

Figure 2:
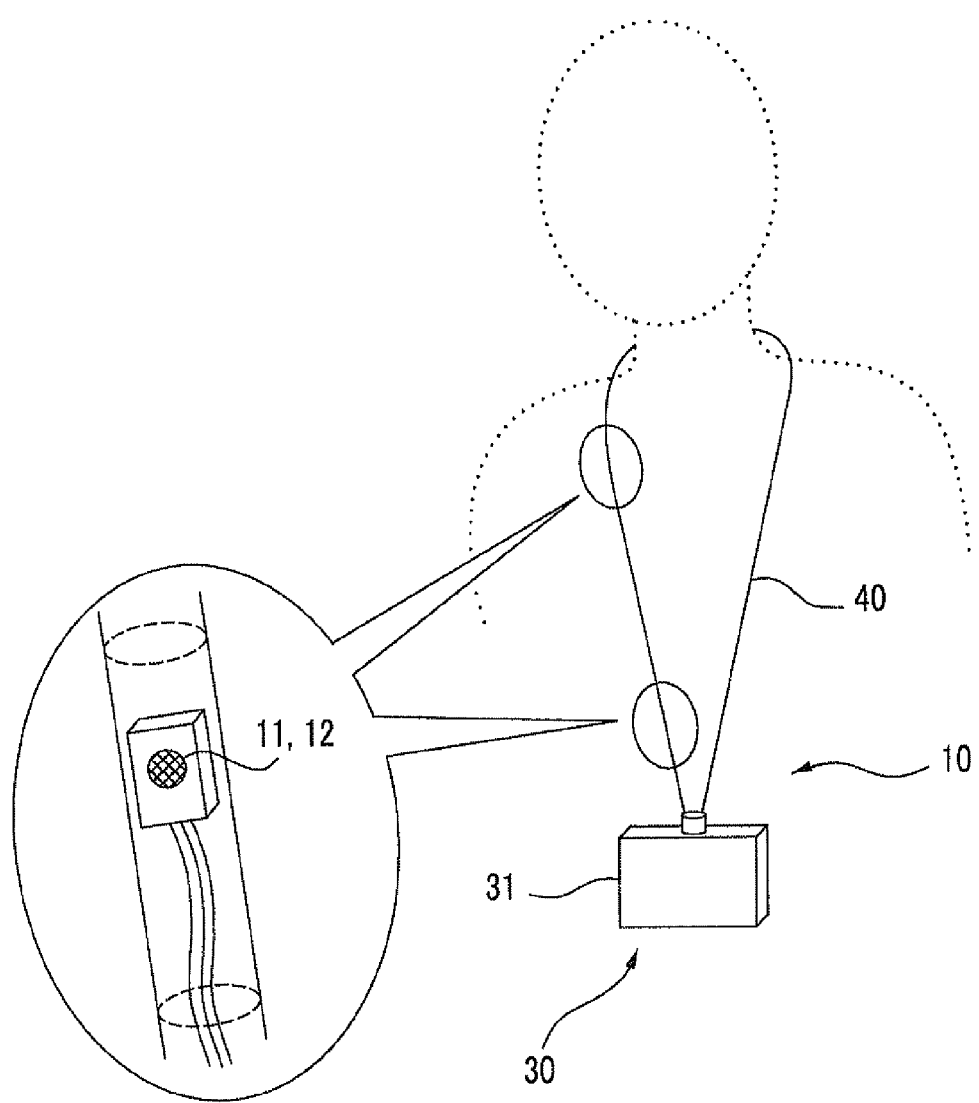
FIG. 2 is a diagram illustrating an example of the structure of a terminal device according to this exemplary embodiment.

FIG. 2 is a diagram illustrating an example of the structure of the terminal device 10. As described above, the terminal device 10 is worn and used by each user. As shown in FIG. 2, in order to enable the user to wear the terminal device 10, the terminal device 10 according to this exemplary embodiment includes a device body 30 and a carrying strap 40 which is connected to the device body 30. In the structure shown in FIG. 2, the user hangs the carrying strap 40 and wears the device body 30 around the neck.

The device body 30 is configured by inserting circuits for implementing at least the first amplifier 13, the second amplifier 14, the voice analysis unit 15, the data transmitting unit 16, and the power supply unit 17 and a power supply (battery) for the power supply unit 17 into a thin rectangular parallelepiped case 31 made of, for example, metal or resin. The case 31 may be provided with a pocket into which, for example, an ID card having ID information, such as the name or position of the wearer, on the surface thereof is inserted. In addition, the ID information may be printed on the surface of the case 31, or a seal having the ID information described thereon may be attached to the case 31.

The microphones 11 and 12 are provided in the carrying strap 40. The microphones 11 and 12 are connected to the first amplifier 13 and the second amplifier 14 in the device body 30 by a cable (for example, a wire) which passes through the carrying strap 40. The carrying strap 40 may be made of various kinds of existing materials, such as leather, synthetic leather, cotton, other natural fibers, synthetic fibers including resin, and metal. In addition, a coating process using, for example, a silicon resin or a fluorine resin may be performed for the carrying strap 40.

The carrying strap 40 has a cylindrical structure and the microphones 11 and 12 are provided in the carrying strap 40. Since the microphones 11 and 12 are provided in the carrying strap 40, the damage or contamination of the microphones 11 and 12 is prevented and the person who talks with the wearer does not recognize the microphones 11 and 12. The first microphone 11 which is arranged at the position distant from the mouth (speaking part) of the wearer may be provided in the device body 30. In this exemplary embodiment, an example in which the first microphone 11 is provided in the carrying strap 40 will be described.

Referring to FIG. 2, the first microphone 11 is provided at the end of the carrying strap 40 connected to the device body 30 (for example, a position that is 10 cm or less away from a connection portion). In this way, the first microphone 11 is arranged at the position that is about 30 cm to about 40 cm away from the mouth (speaking part) of the wearer when the wearer wears the carrying strap 40 around the neck with the device body 30 down. When the first microphone 11 is provided in the device body 30, similarly, the distance from the mouth (speaking part) of the wearer to the first microphone 11 is the same as the above.

The second microphone 12 is provided at a position (for example, a position that is about 20 cm to about 30 cm away from the connection portion) that is away from the end of the carrying strap 40 connected to the device body 30. In this case, when the wearer wears the carrying strap 40 around the neck with the device body 30 down, the second microphone 12 is disposed at the bottom of the neck (for example, a position corresponding to the collarbone) of the wearer and is arranged at the position that is about 10 cm to about 20 cm away from the mouth (speaking part) of the wearer.

The terminal device 10 according to this exemplary embodiment is not limited to the structure shown in FIG. 2. For example, the positional relationship between the first microphone 11 and the second microphone 12 may be specified such that the distance of a sound wave arrival path from the first microphone 11 to the mouth (speaking part) of the wearer is about several times more than that of a sound wave arrival path from the second microphone 12 to the mouth (speaking part) of the wearer. Therefore, the first microphone 11 may be provided in a portion of the carrying strap 40 which is positioned on the rear side of the neck. In addition, in this exemplary embodiment, as described above, the microphones 11 and 12 are provided in the carrying strap 40. However, the invention is not limited to the structure, but the microphones 11 and 12 may be worn by the wearer in various ways. For example, the first microphone 11 and the second microphone 12 may be independently fixed to clothes by, for example, pins. In addition, a dedicated fixing tool which is designed such that the first microphone 11 and the second microphone 12 are fixed at desired positions may be prepared and used to fix the first microphone 11 and the second microphone 12.

As shown in FIG. 2, the device body 30 is not limited to the structure in which it is connected to the carrying strap 40 and is worn around the neck of the wearer, but may be configured so as to be easy to carry. For example, the device body 30 may be configured so as to be fixed to clothes or the body by a clip or a belt, not the carrying strap 40 according to this exemplary embodiment. Alternatively, the device body 30 may be simply put into the pocket and carried. In addition, mobile phones or other existing portable electronic information terminals may be configured so as to have a function of receiving voice signals from the microphones 11 and 12, amplifying the received voice signals, and analyzing the amplified voice signals.

Furthermore, the microphones 11 and 12 and the device body 30 (or the voice analysis unit 15) may not be connected to each other by a wire, but may be connected to each other by wireless communication. In the above-mentioned example of the structure, the first amplifier 13, the second amplifier 14, the voice analysis unit 15, the data transmitting unit 16, and the power supply unit 17 are provided in one case 31. However, they may be configured as plural components. For example, the power supply unit 17 may not be provided in the case 31, but may be connected to an external power supply for use.

Identification of Speakers (Wearer and Others) Based on Non-verbal Information of Acquire Voice Next, a speaker identification method according to this exemplary embodiment will be described.

The system according to this exemplary embodiment identifies the voice (wearer's spoken voice) spoken by the wearer of the terminal device 10 and the voice spoken by another person using the voice information acquired by two microphones 11 and 12 of the terminal device 10. In other words, this exemplary embodiment identifies the speaker of the acquired voice. In addition, in this exemplary embodiment, the speaker is identified on the basis of non-verbal information, such as sound pressure (volume input to the microphones 11 and 12), not language information obtained by morpheme analysis or dictionary information, among information items about the acquired voice. That is, the speaker of the voice is identified from a speaking situation specified by non-verbal information, not the content of speech specified by the language information.

As described with reference to FIGS. 1 and 2, in this exemplary embodiment, the first microphone 11 of the terminal device 10 is arranged at the position distant from the mouth (speaking part) of the wearer and the second microphone 12 is arranged at the position close to the mouth (speaking part) of the wearer. That is, when the mouth (speaking part) of the wearer is a sound source, there is a large difference between the distance between the first microphone 11 and the sound source and the distance between the second microphone 12 and the sound source. Specifically, the distance between the first microphone 11 and the sound source is about 1.5 to 4 times more than the distance between the second microphone 12 and the sound source. The sound pressure of the voice acquired by the microphones 11 and 12 is attenuated (distance attenuation) as the distance between the microphones 11 and 12 and the sound source increases. Therefore, for the voice spoken by the wearer, there is a large difference between the sound pressure of the voice acquired by the first microphone 11 and the sound pressure of the voice acquired by the second microphone 12.

It is considered that the mouth (speaking part) of a person (another person) other than the wearer is the sound source. In this case, since another person is away from the wearer, there is no large difference between the distance between the first microphone 11 and the sound source and the distance between the second microphone 12 and the sound source. There may be a difference between the distances depending on the position of another person relative to the wearer. However, in this case, unlike when the mouth (speaking part) of the wearer is the sound source, the distance between the first microphone 11 and the sound source is not several times more than the distance between the second microphone 12 and the sound source. Therefore, for the voice spoken by another person, there is no large difference between the sound pressure of the voice acquired by the first microphone 11 and the sound pressure of the voice acquired by the second microphone 12, unlike the voice spoken by the wearer.

Figure 3:
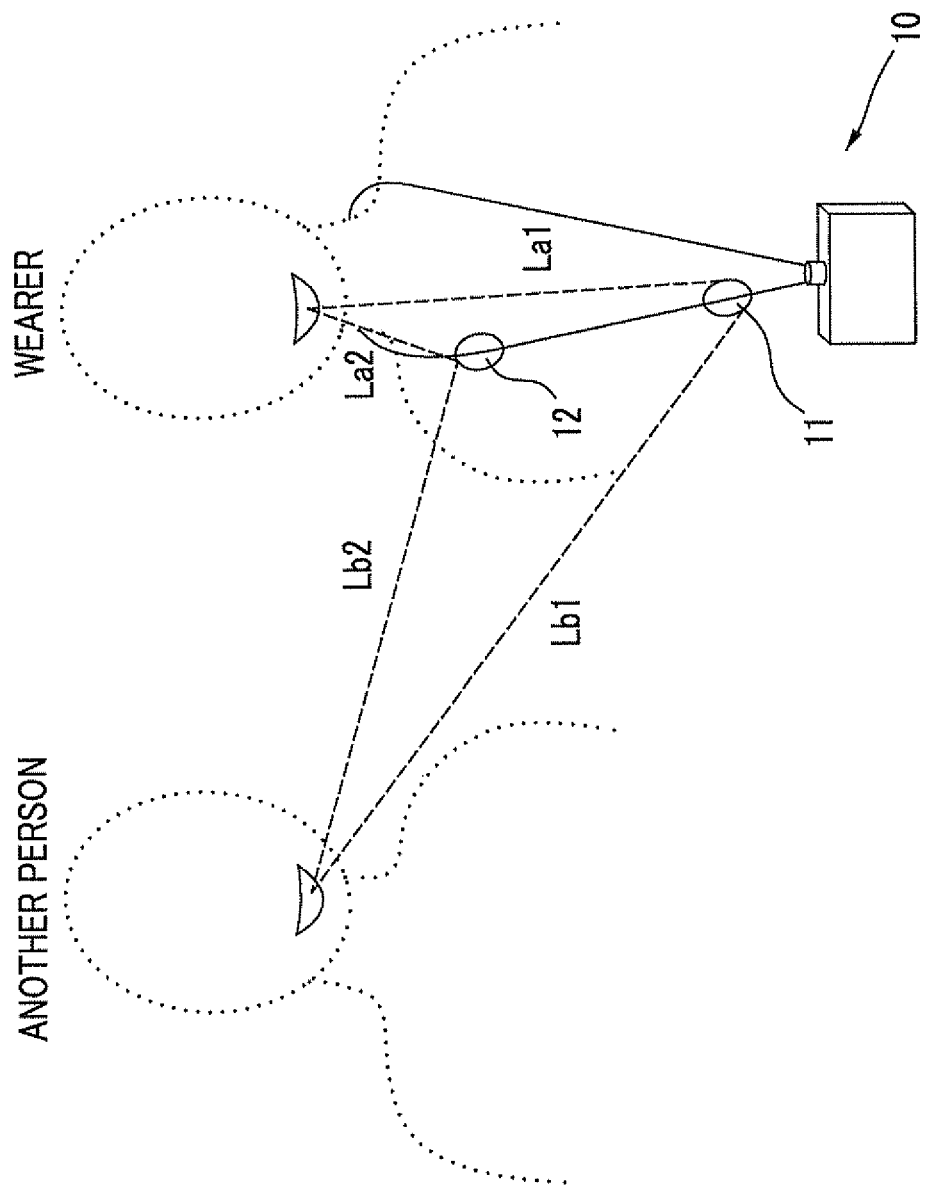
FIG. 3 is a diagram illustrating the positional relationship between the mouths (speaking parts) of a wearer and another person and microphones.

FIG. 3 is a diagram illustrating the positional relationship between the mouths (speaking part) of the wearer and another person and the microphones 11 and 12. In the relationship shown in FIG. 3, it is assumed that the distance between a sound source a, which is the mouth (speaking part) of the wearer, and the first microphone 11 is La1 and the distance between the sound source a and the second microphone 12 is La2. In addition, it is assumed that the distance between a sound source b, which is the mouth (speaking part) of another person, and the first microphone 11 is Lb1 and the distance between the sound source b and the second microphone 12 is Lb2. In this case, the following relationship is established:

$$La1 > La2 (La1 \approx 1.5 \times La2 \sim 4 \times La2)$$

$$Lb1 \approx Lb2$$

Figure 4:
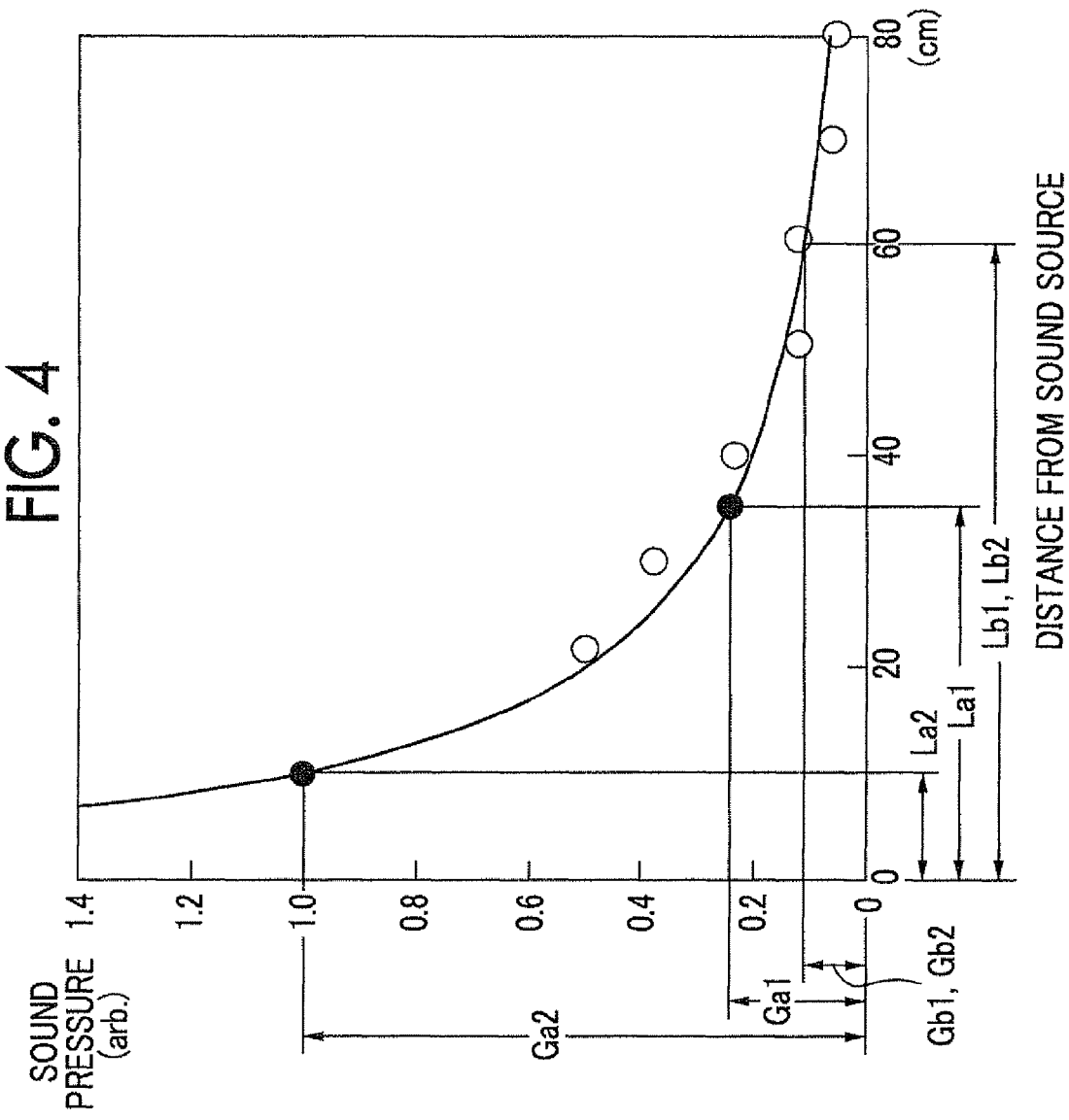
FIG. 4 is a diagram illustrating the relationship between sound pressure (input volume) and the distance between the microphone and a sound source.

FIG. 4 is a diagram illustrating the relationship between sound pressure (input volume) and the distance between the microphones 11 and 12 and the sound source. As described above, the sound pressure is attenuated according to the distance between the microphones 11 and 12 and the sound source. In FIG. 4, when sound pressure Ga1 at the distance La1 is compared with sound pressure Ga2 at the distance La2, the sound pressure Ga2 is about four times more than the sound pressure Ga1. Since the distance Lb1 is approximate to the distance Lb2, sound pressure Gb1 at the distance Lb1 is substantially equal to sound pressure Gb2 at the distance Lb2. In this exemplary embodiment, the voice spoken by the wearer and the voice spoken by another person in the acquired voice are identified using a difference in the sound pressure ratio. In the example shown in FIG. 4, the distances Lb1 and Lb2 are 60 cm. However, it is important that the sound pressure Gb1 and the sound pressure Gb2 are substantially equal to each other, but the distances Lb1 and Lb2 are not limited to the value shown in FIG. 4.

Figure 5:
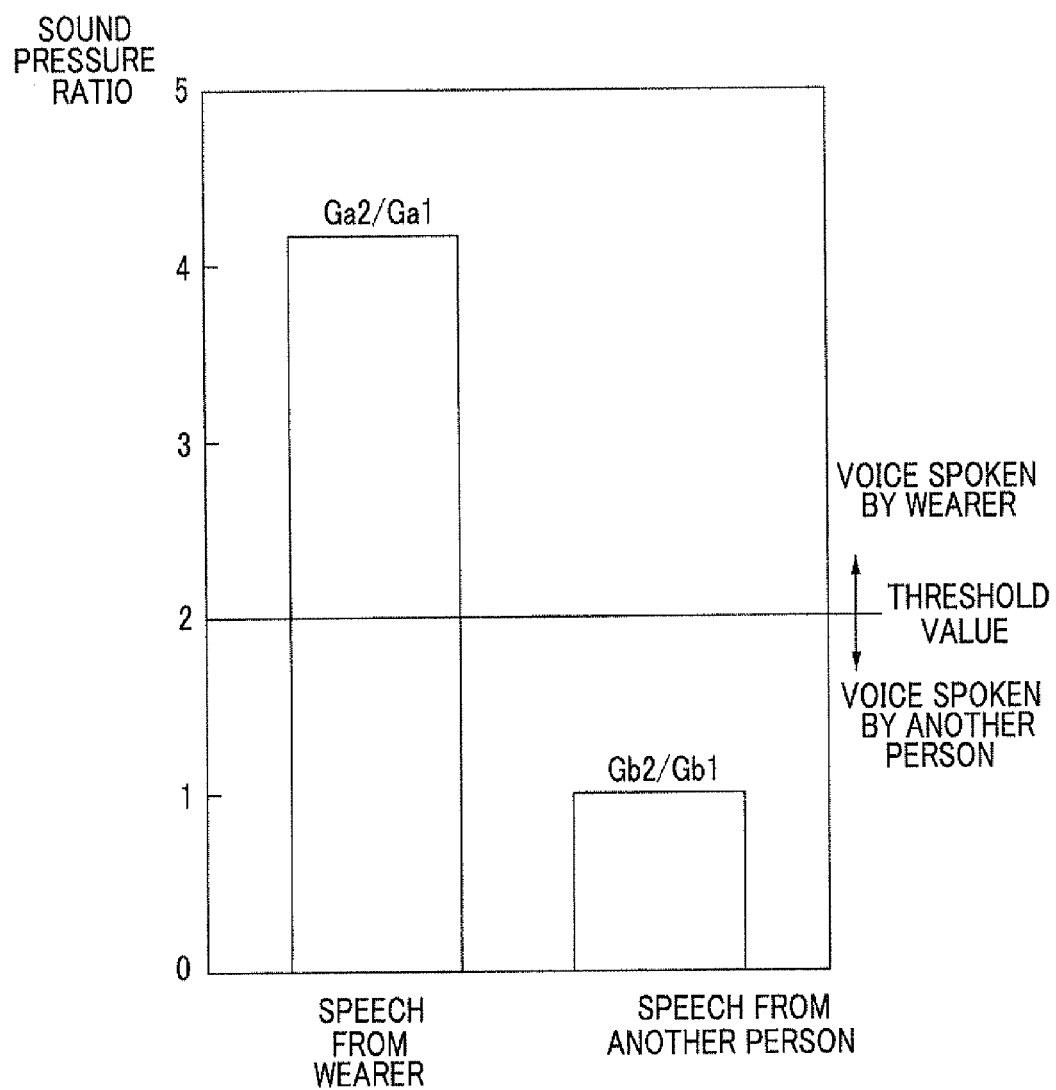
FIG. 5 is a diagram illustrating a method of identifying the voice spoken by the wearer and the voice spoken by another person.

FIG. 5 is a diagram illustrating a method of identifying the voice spoken by the wearer and the voice spoken by another person. As described with reference to FIG. 4, for the voice spoken by the wearer, the sound pressure Ga2 of the second microphone 12 is several times (for example, four times) more than the sound pressure Ga1 of the first microphone 11. For the voice spoken by another person, the sound pressure Ga2 of the second microphone 12 is substantially equal to (about one time more than) the sound pressure Ga1 of the first microphone 11. Therefore, in this exemplary embodiment, a threshold value is set for the ratio of the sound pressure of the second microphone 12 to the sound pressure of the first microphone 11. A voice with a sound pressure ratio greater than the threshold value is determined to be the voice spoken by the wearer and a voice with a sound pressure ratio less than the threshold value is determined to be the voice spoken by another person. In the example shown in FIG. 5, the threshold value is set to 2. Since the sound pressure ratio Ga2/Ga1 is greater than a threshold value of 2, the voice is determined to be the voice spoken by the wearer. Since the sound pressure ratio Gb2/Gb1 is less than a threshold value of 2, the voice is determined to be the voice spoken by another person.

However, the voice acquired by the microphones 11 and 12 includes so-called noise, such as an environmental sound, in addition to the spoken voice. The relationship between the sound source of the noise and the distance between the sound source and the microphones 11 and 12 is similar to that in the voice spoken by another person. That is, similarly to the example shown in FIGS. 4 and 5, when the distance between a sound source c of noise and the first microphone 11 is Lc1 and the distance between the sound source c of noise and the second microphone 12 is Lc2, the distance Lc1 is approximate to the distance Lc2. Therefore, in many cases, the sound source of noise is further away from the wearer than another person and the sound pressure ratio Gc2/Gc1 of the voices acquired by the microphones 11 and 12 is less than a second threshold value. However, the noise is separated and removed from the spoken voice by a filtering process using the existing technique which uses, for example, a bandpass filter or a gain filter.

Phase Difference Between Sound Waves with Plural Frequencies Included in Voice

Figure 6:
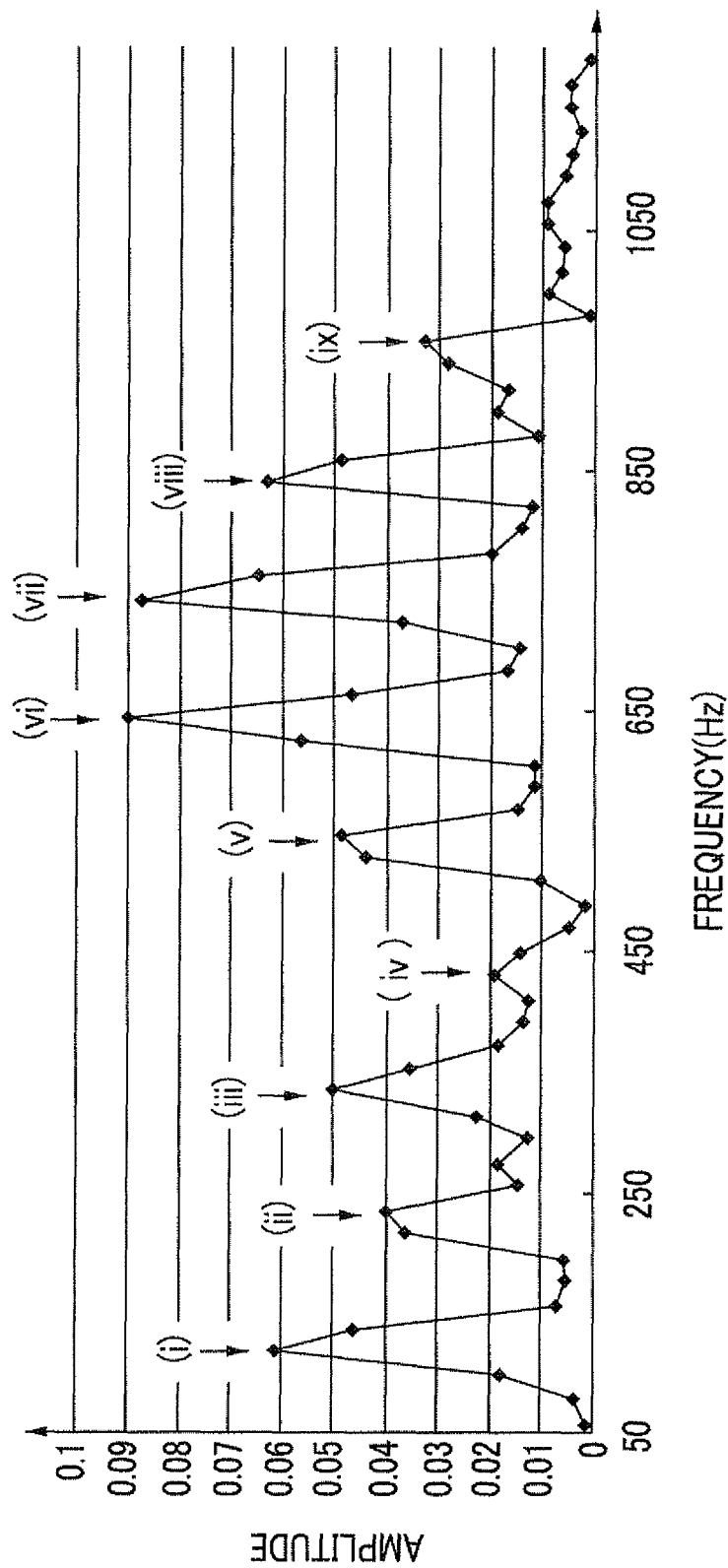
FIG. 6 is a diagram illustrating sound waves with various frequencies included in the voice.

Next, a method of calculating the phase difference between the sound waves with plural frequencies included in the voice in this exemplary embodiment will be described. FIG. 6 is a diagram illustrating the sound waves with various frequencies included in the voice. FIG. 6 shows a power spectrum when a sound "a" is spoken as an example of the voice. In FIG. 6, the horizontal axis indicates a frequency (Hz) after Fourier transform is performed for the voice and the vertical axis indicates an amplitude. As can be seen from the power spectrum shown in FIG. 6, the sound wave included in the voice includes a sound wave component with a fundamental frequency of about 117 Hz and sound wave components with frequencies that are an integer multiple of the fundamental frequency. In FIG. 6, the sound wave component with the fundamental frequency is represented by (i) and the sound wave components with frequencies that are an integer multiple of the fundamental frequency are represented by (ii), (iii), (iv), (v), (vi), (vii), (viii), and (ix). In this case, the pitch between the frequencies of the sound waves represented by (i) to (ix) is about 117 Hz.

Figure 7A:
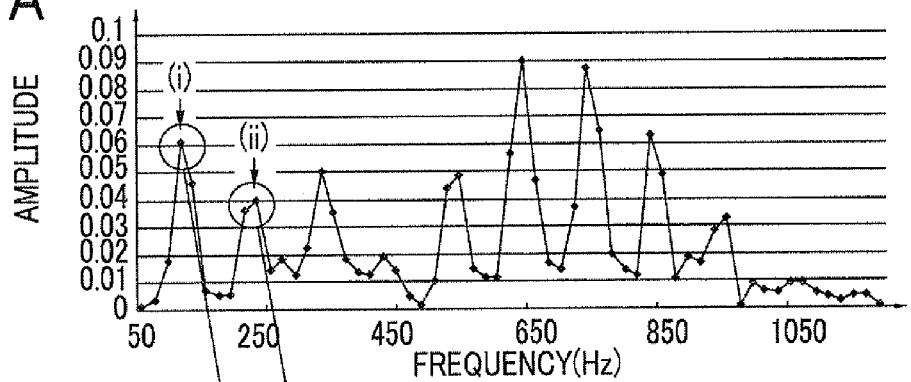
FIGS. 7A to 7C are diagrams illustrating the concept of the phase difference between the sound waves at two frequencies when the sound waves with two frequencies are selected.
Figure 7B:
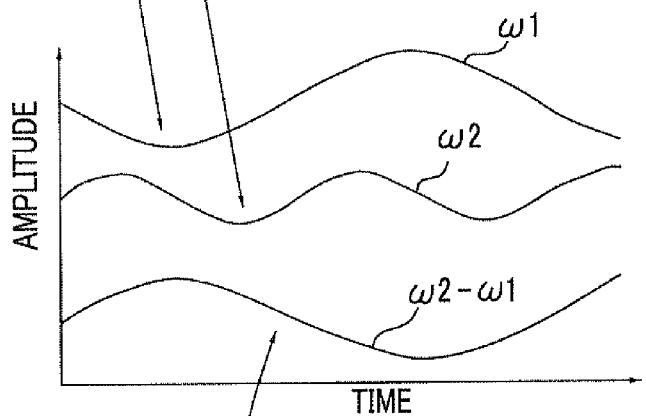
Figure 7C:
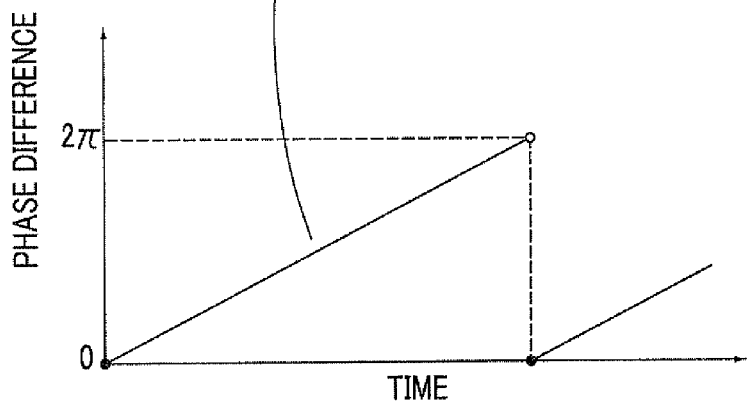

In this exemplary embodiment, plural frequencies included in the voice are selected. The phase difference between the sound waves at each of the frequencies is calculated. FIGS. 7A to 7C are diagrams illustrating the concept of the phase difference between the sound waves at two frequencies when the sound waves with two frequencies are selected. FIG. 7A is the power spectrum shown in FIG. 6. FIG. 7B shows the waveforms of the sound waves, in which the horizontal axis indicates time and the vertical axis indicates an amplitude. Among the sound waves, the waveform of a sound wave represented by "ω1" is the waveform of the sound wave with the fundamental frequency which is represented by (i) in FIG. 6. The waveform of a sound wave represented by "ω2" is the waveform of the sound wave with a frequency that is an integer multiple of the fundamental frequency which is represented by (ii) in FIG. 6. As shown in FIG. 7B, "ω1" and "ω2" are sine waves.

In addition, "ω2−ω1" indicates the phase difference between the sound wave represented by "ω1" and the sound wave represented by "ω2". That is, since the sound wave represented by "ω1" and the sound wave represented by "ω2" have different frequencies, the phase difference therebetween is changed at a constant ratio over time. As a result, as shown in FIG. 7C, the phase difference is periodically changed between 0 and $2\pi$ and may be shown as a virtual sine wave as represented by "$\omega2-\omega1$". That is, the wave "$\omega2-\omega1$" indicates how the phase difference between the sound waves with two frequencies is changed over time.

In the above-mentioned example, in FIG. 6, the sound wave with the frequency represented by (i) and the sound wave with the frequency represented by (ii) are combined with each other and the phase difference therebetween is considered. However, for the combination, for example, two of the sound waves with the frequencies represented by (i) to (ix) in FIG. 6 are selected. That is, in this exemplary embodiment, FIGS. 7A to 7C, two of the frequencies forming the peaks are selected. However, the invention is not limited thereto, but an arbitrary frequency which does not form the peak may be selected.

Example of Operation of Terminal Device

FIG. 8 is a flowchart illustrating the operation of the terminal device 10 according to this exemplary embodiment. As shown in FIG. 8, when the microphones 11 and 12 of the terminal device 10 acquire a voice, an electric signal (voice signal) corresponding to the acquired voice is transmitted from each of the microphones 11 and 12 to the first amplifier 13 and the second amplifier 14 (Step 101). When acquiring the voice signal from the microphones 11 and 12, the first amplifier 13 and the second amplifier 14 amplify the signal and transmit the amplified signal to the voice analysis unit 15 (Step 102).

The voice analysis unit 15 performs a filtering process for the signal amplified by the first amplifier 13 and the second amplifier 14 and removes a noise component, such as an environmental sound, from the signal (Step 103). Then, the voice analysis unit 15 calculates the average sound pressure of the voice acquired by each of the microphones 11 and 12 for the signal from which the noise component has been removed at a predetermined time interval (for example, tenths to hundredths of a second) (Step 104). Then, the voice analysis unit 15 determines whether the average sound pressure is equal to or greater than a given threshold value (whether there is a gain) (Step 105).

Then, when there is the gain of the average sound pressure of each of the microphones 11 and 12 calculated in Step 104 (Yes in Step 105), the voice analysis unit 15 determines that there is a spoken voice (speech has been made). Then, the voice analysis unit 15 calculates the ratio of the average sound pressure of the first microphone 11 and the average sound pressure of the second microphone 12 (sound pressure ratio) (Step 106). When the sound pressure ratio calculated in Step 106 is greater than the threshold value (Yes in Step 107), the voice analysis unit 15 determines that the spoken voice is of the wearer (Step 108). When the sound pressure ratio calculated in Step 106 is less than the threshold value (No in Step 107), the voice analysis unit 15 determines that the spoken voice is of another person (Step 109). On the other hand, when there is no gain of the average sound pressure of each of the microphones 11 and 12 calculated in Step 104 (No in Step 105), the voice analysis unit 15 determines that there is no spoken voice (speech has not been made) (Step 110).

Then, the voice analysis unit 15 performs fast Fourier transform (FFT) for the spoken voice to create the power spectrum shown in FIG. 6 (Step 111). In addition, the voice analysis unit 15 selects plural frequencies from the power spectrum (Step 112) and calculates the phase difference between the sound waves at each of the selected frequencies (Step 113).

Then, the voice analysis unit 15 transmits information obtained in the process from Step 104 to Step 113 as the analysis result to the host device 20 through the data transmitting unit 16 (Step 114). Examples of the analysis result include information indicating whether speech is made, information (terminal ID) about the wearer, speaker identification information, which is information for determining whether the voice acquired by the microphones 11 and 12 is the voice spoken by the wearer or the voice spoken by a person other then the wearer, the frequency of the voice selected in Step 112, and the phase difference between the sound waves calculated in Step 113. In this case, the duration of the speaking time of each speaker (the wearer or another person), the value of the gain of the average sound pressure, and other additional information may be transmitted together with the analysis result to the host device 20.

In this exemplary embodiment, the sound pressure of the first microphone 11 is compared with the sound pressure of the second microphone 12 to determine whether the spoken voice is the voice spoken by the wearer or the voice spoken by another person. However, this exemplary embodiment is not limited thereto, but it is preferable that the speaker be identified without analyzing the language information. A method of identifying the speaker on the basis of non-verbal information is not limited to the comparison of the sound pressure. For example, the time when the first microphone 11 acquires the voice (the output time of the voice signal) may be compared with the time when the second microphone 12 acquires the voice. In this case, for the voice spoken by the wearer, since there is a large difference between the distance from the mouth (speaking part) of the wearer to the first microphone 11 and the distance from the mouth (speaking part) of the wearer to the second microphone 12, there is a little difference (time difference) between the voice acquisition times. On the other hand, for the voice spoken by another person, since there is a small difference between the distance from the mouth (speaking part) of another person to the first microphone 11 and the distance from the mouth (speaking part) of another person to the second microphone 12, the difference (time difference) between the voice acquisition times is less than that for the voice spoken by the wearer. A threshold value may be set to the difference between the voice acquisition times, it may be determined that the wearer speaks the voice when the difference between the voice acquisition time is greater than the threshold value, and it may be determined that another person speaks the voice when the difference between the voice acquisition time is less than the threshold value.

Calculation of Distance between Wearers-First Exemplary Embodiment

The data receiving unit 21 of the host device 20 receives information about a voice including information about the analysis result. When the host device 20 receives the information about a voice, the data analysis unit 23 analyzes the voices transmitted from plural terminal devices 10 and calculates the distance between the wearers. Next, a detailed method of calculating the distance between the wearers in this exemplary embodiment will be described. Here, a case in which two wearers talk with each other is considered.

FIG. 9 is a diagram illustrating the method of calculating the distance between two wearers when the two wearers talk with each other. In FIG. 9, there are a wearer A (first wearer) and a wearer B (second wearer) as two wearers and the wearer A speaks. For convenience of explanation, here, it is assumed that the terminal device 10 worn by the wearer A is referred to as a terminal device 10A. In addition, it is assumed that the terminal device 10 worn by the wearer B is referred to as a terminal device 10B. In this case, the microphones 11 and 12 provided in the terminal device 10A may be regarded as a first voice acquiring unit and the microphones 11 and 12 provided in the terminal device 10B may be regarded as a second voice acquiring unit.

FIG. 10 shows an aspect in which that the voice spoken by the wearer A includes sound waves with different frequencies, that is, a sound wave represented by "$\omega 1$" and a sound wave represented by "$\omega 2$" and the sound waves travel toward the terminal device 10A and the terminal device 10B. In this case, as described with reference to FIG. 7, a virtual sine wave represented by "$\omega 2-\omega 1$" is obtained from the sound wave represented by "$\omega 1$" and the sound wave represented by "$\omega 2$". In this situation, the voice spoken by the wearer A may be first acquired by the terminal device 10A of the wearer A over time. Then, the voice may be acquired by the terminal device 10B of the wearer B. Then, the terminal device 10A and the terminal device 10B may obtain the phase difference between the sound wave represented by "$\omega 1$" and the sound wave represented by "$\omega 2$". In other words, it is possible to obtain the phase of the sine wave represented by "$\omega 2-\omega 1$".

The data receiving unit 21 receives the phase of the sine wave represented by "$\omega 2-\omega 1$" and transmits the phase to the data analysis unit 23. The frequency of the sine wave represented by "$\omega 2-\omega 1$" is the difference between the frequency of the sound wave represented by "$\omega 1$" and the frequency of the sound wave represented by "$\omega 2$". The sound speed may be calculated from, for example, the temperature or pressure of the space including the wearer A and the wearer B. Since the wavelength of the sine wave represented by "$\omega 2-\omega 1$" is known, it is possible to calculate the distance between the terminal device 10A and the terminal device 10B on the basis of the phase of the sine wave represented by "$\omega 2-\omega 1$". Since the distance is substantially equal to the distance between the wearer A and the wearer B, it may be regarded as the distance between the wearers (the distance between the first wearer and the second wearer). That is, here, the phase with the phase difference which is calculated when the voice spoken by one (wearer A) of plural wearers is acquired as the wearer's own voice is compared with the phase with the phase difference which is calculated when the voice is acquired as the voice spoken by another person to calculate the distance between the wearers. In other words, when the microphones 11 and 12 of the wearer A acquire the voice as the voice spoken by the wearer A and the microphones 11 and 12 of the wearer B acquire the same voice as that acquired by the microphones 11 and 12 of the wearer A as the voice spoken by another person, it is possible to calculate the distance between the wearer A and the wearer B on the basis of the phases with the phase difference which is calculated from the voice.

Example of Operation of Host Device

FIG. 10 is a flowchart illustrating the operation of the host device 20 according to this exemplary embodiment. Next, the operation of the host device 20 according to this exemplary embodiment will be described with reference to FIGS. 1 and 10. First, the data receiving unit 21 receives information about a voice including speaker identification information, the frequency of the voice selected in Step 112 of FIG. 8, and the phase difference between the sound waves calculated in Step 113 from plural terminal devices 10 (Step 201). Then, the information is stored in the data storage unit 22 (Step 202).

Then, the data analysis unit 23 analyzes the voices transmitted from the terminal devices 10 of plural wearers and calculates the distance between the wearers. In order to determine the conversation relationship between the wearers, first, the data analysis unit 23 detects the voice which is determined to be the voice spoken by the wearer on the basis of the speaker identification information transmitted from the terminal devices 10 (Step 203). Then, the data analysis unit 23 acquires the phase difference between the sound waves for the spoken voice which is detected as the voice spoken by the wearer (Step 204).

In addition, the data analysis unit 23 detects the voice which is determined to be the voice spoken by another person in correspondence with the voice which is detected as the voice spoken by the wearer (Step 205). For example, the data analysis unit 23 may detect data for the voice spoken by another person which is substantially synchronized with the on and off timing of the voice spoken by the wearer in Step 203. In addition, the data analysis unit 23 acquires the phase difference between the sound waves for the spoken voice which is detected as the voice spoken by another person (Step 206).

Then, the data analysis unit 23 calculates the distance between the wearers from the frequency of the voice when the phase difference is acquired, the difference between the phase differences acquired in Step 204 and Step 206, and the sound speed (Step 207).

In this way, it is possible to calculate the distance between the wearers who wear the terminal devices 10. Then, it is possible to analyze the communication tendency of each wearer on the basis of the distance.

In the method according to the related art which simply obtains the phase of the sound wave propagating from the wearer A to the wearer B to calculate the distance between the wearers, it is necessary to know the absolute phase of the sound wave. In addition, it is necessary to strictly know the time when the phase of the sound wave is acquired. That is, for a sound wave with a predetermined frequency, the following are needed: the time when the voice is acquired by the terminal device 10A of the wearer A and the absolute phase of the sound wave; and the time when the voice is acquired by the terminal device 10B of the wearer B and the absolute phase of the sound wave. However, accurate measurement is needed in order to acquire the absolute phase. In many cases, in general, it is difficult to accurately measure the acquisition time. For example, clocks may be provided in the terminal device 10A and the terminal device 10B and the voice acquisition time may be measured by the clock. This is because it is necessary to strictly synchronize the clocks of the terminal device 10A and the terminal device 10B.

In contrast, in this exemplary embodiment, for the sound waves with two frequencies, it is preferable to know the phase difference of the voice acquired by the terminal device 10A of the wearer A and the phase difference of the voice acquired by the terminal device 10B of the wearer B, in addition to the speaker identification information. Therefore, it is not necessary to know the voice acquisition time or the absolute phase. The phase difference of the voice may be acquired by simple calculation such as subtraction.

In the above-mentioned example, the terminal device 10 identifies the voice spoken by the wearer and the voice spoken by another person or calculates the phase difference between the sound waves. However, the invention is not limited thereto. The host device 20 may perform the identification of the voice and the calculation of the phase difference. In the voice analysis system 1 according to this exemplary embodiment, as compared to the voice analysis system shown in FIG. 1, the data analysis unit 23 of the host device 20 performs the process of identifying the voice spoken by the wearer and the voice spoken by another person which has been performed by the voice analysis unit 15.

In the above-mentioned example, the terminal device 10 identifies the voice spoken by the wearer and the voice spoken by another person. However, the invention is not limited thereto. For example, any device which can identify the voice spoken by the wearer and the voice spoken by another person may be used. For example, a directional microphone may be used, and the voice spoken by the wearer and the voice spoken by another person may be identified using the fact that the sound pressure acquired by the directional microphone varies depending on the arrival direction of the spoken voice. In this case, the directional microphone functions as a voice acquiring unit.

Calculation of Distance between Wearers-Second Exemplary Embodiment

Figure 11:
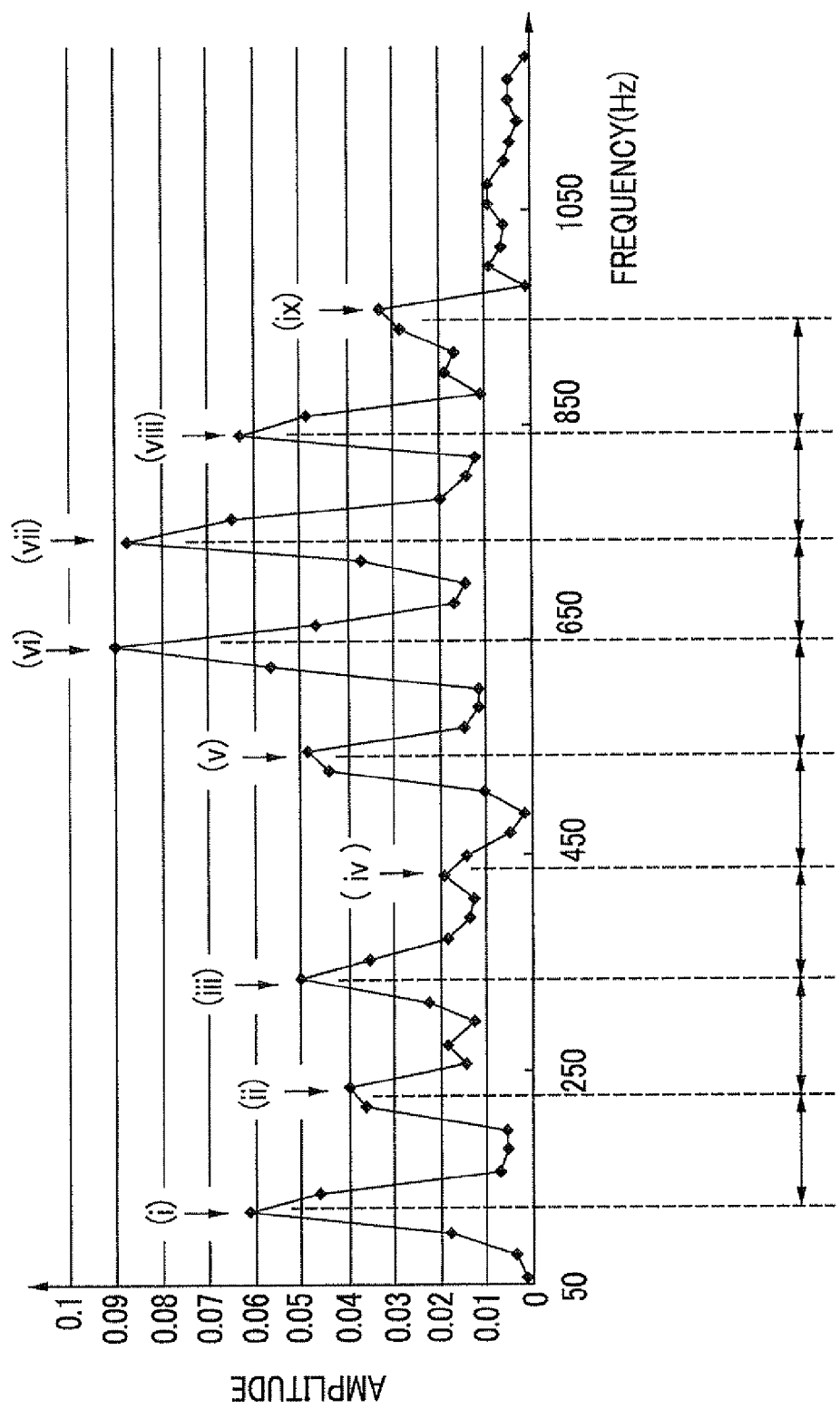
FIG. 11 is a diagram illustrating a first example in which sound waves with three or more different frequencies are selected from a spoken voice and the sound waves with each frequency are used to calculate plural phase differences between the sound waves.

In the above-mentioned example, for ease of understanding, the sound waves with two different frequencies are selected from the spoken voice and a phase difference between the two sound waves is calculated. However, the invention is not limited thereto. FIG. 11 is a diagram illustrating a first example in which sound waves with three or more different frequencies are selected from a spoken voice and plural phase differences between the sound waves are calculated using the sound waves with different frequencies. FIG. 11 shows a case in which, among the sound waves with frequencies represented by (i) to (ix), the sound waves with adjacent frequencies are selected. That is, in this case, eight sets of sound waves with frequencies, that is, (i) and (ii) (ii) and (iii), (iii) and (iv), (iv) and (v) (v) and (vi), (vi) and (vii), (vii) and (viii), and (viii) and (ix) are selected and the phase differences therebetween are calculated. As described with reference to FIG. 6, the difference between the frequencies is substantially constant, that is, about 117 Hz. The phase difference between the sound waves in each of the eight sets is used to calculate the distance between the wearers. That is, eight sets of the sound waves with frequencies are selected to obtain eight phase differences. In addition, it is possible to calculate eight distances between the wearers from the eight phase differences. In this exemplary embodiment, it is assumed that the calculated eight distances are used as the provisional distances between the wearers and the average of the provisional distances is used as the final distance between the wearers. The averaging of the provisional distances makes it possible to accurately calculate the distance between the wearers.

Even in the method of according to the related art which acquires the phase of the sound wave propagating from the wearer A to the wearer B to calculates the distance between the wearers, it is possible to improve the accuracy of the distance between the wearers by acquiring the phases of the sound waves with plural frequencies. However, in this case, the band of the selectable frequency of the sound wave is not wide. That is, when a high frequency is used to calculate the distance between the wearers, the following problem of a periodic solution occurs. Specifically, when the pitch of the periodic solution is too small, it is difficult to determine a correct solution. Therefore, the number of selectable frequencies is reduced. As a result, when the distance between the wearers is calculated, there are limitations in improving accuracy. In contrast, in this exemplary embodiment, since the frequency difference between the sound waves with different frequencies is used, it is possible to combine sound waves with high frequencies and thus obtain various combinations. Therefore, the above-mentioned problem does not occur.

Description of Periodic Solution

Figure 12:
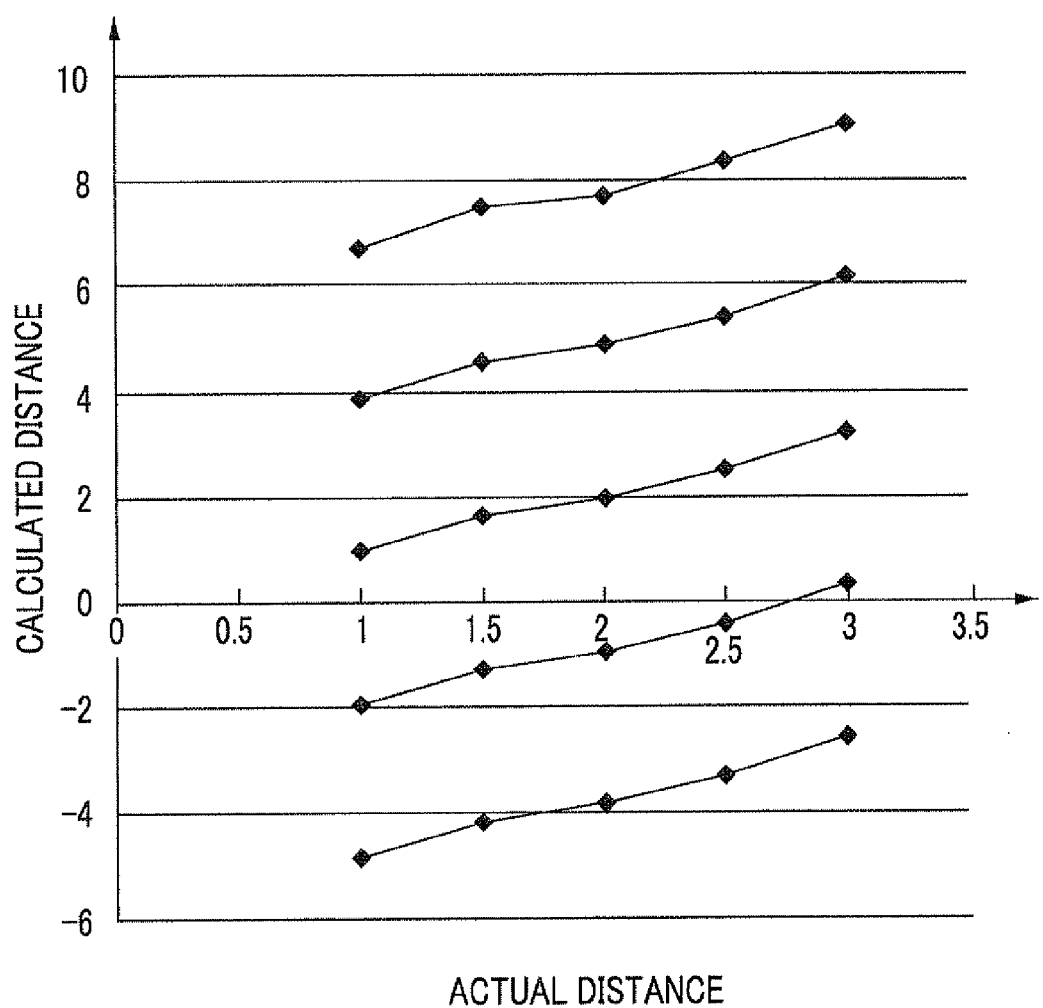
FIG. 12 is a diagram illustrating a periodic solution.

Next, the periodic solution will be described. FIG. 12 is a diagram illustrating the periodic solution. In FIG. 12, the horizontal axis indicates the actual distance between the wearers. The vertical axis indicates the distance between the wearers which is calculated by the method according to this exemplary embodiment. For example, when the actual distance between the wearers is 2 m, in some cases, the distance between the wearers which is calculated by the method according to this exemplary embodiment is −3.8 m, −0.9 m, 4.9 m, and 7.8 m in addition to 2 m. The phase difference between two sound waves with different frequencies is between 0 and 2π. When the phase difference is shifted by one period, it returns to the original value. Therefore, whenever the phase difference is shifted by one period, each solution is obtained. In FIG. 12, since the length of one period is 2.9 m, the periodic solution is obtained at a pitch of 2.9 m. In this exemplary embodiment, it is necessary to select the correct solution from the plural solutions. As an example of a method of selecting the correct solution, the following method may be used: a method of excluding an excessively short distance or an excessively long distance as the distance for conversation between the wearers to calculate the distance. In this way, it is possible to select an appropriate distance of 2 m.

Calculation of Distance Between Wearers-Third Exemplary Embodiment

Figure 13:
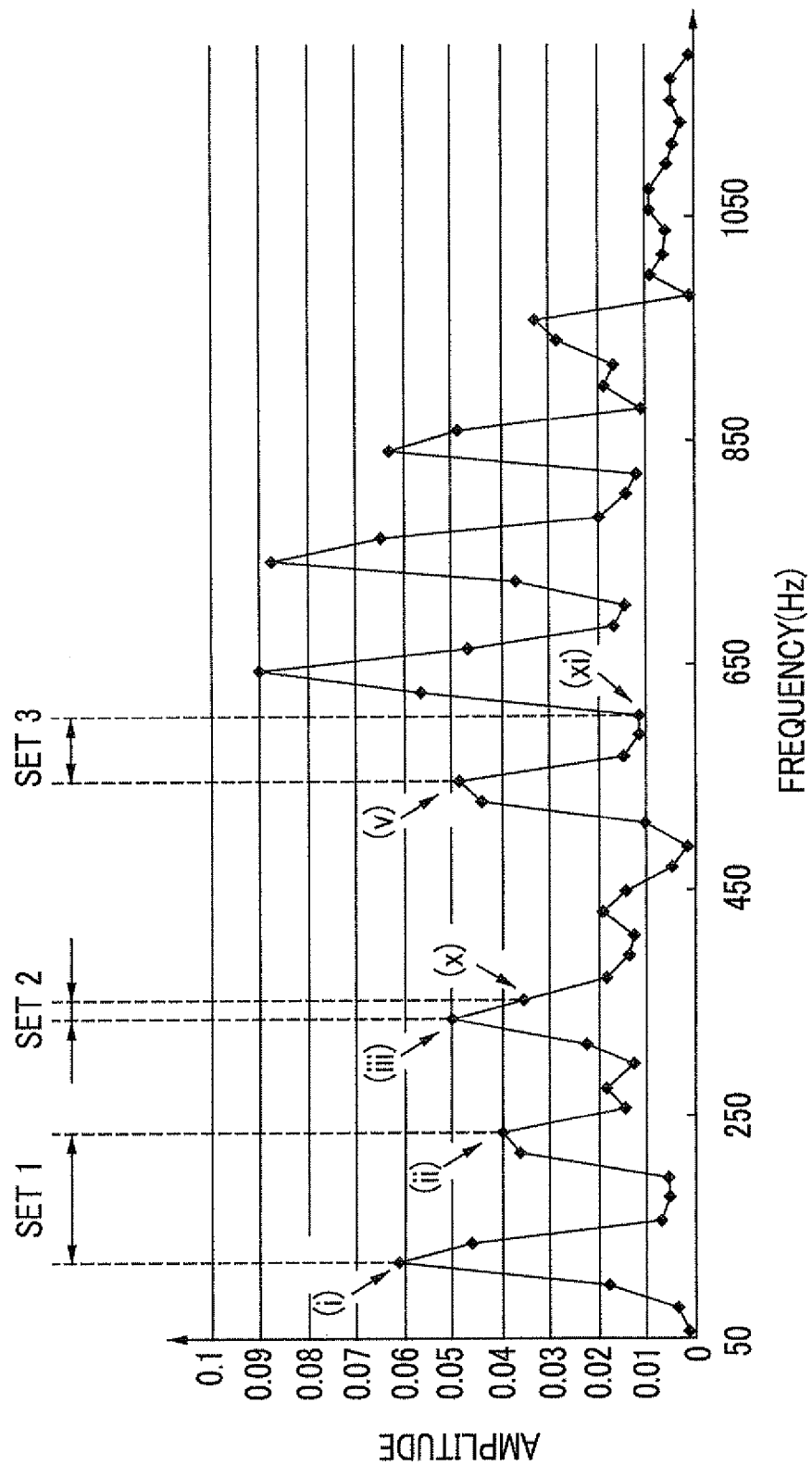
FIG. 13 is a diagram illustrating a second example in which sound waves with three or more different frequencies are selected from the spoken voice and the sound waves with each frequency are used to calculate plural phase differences between the sound waves.
Figure 14A:
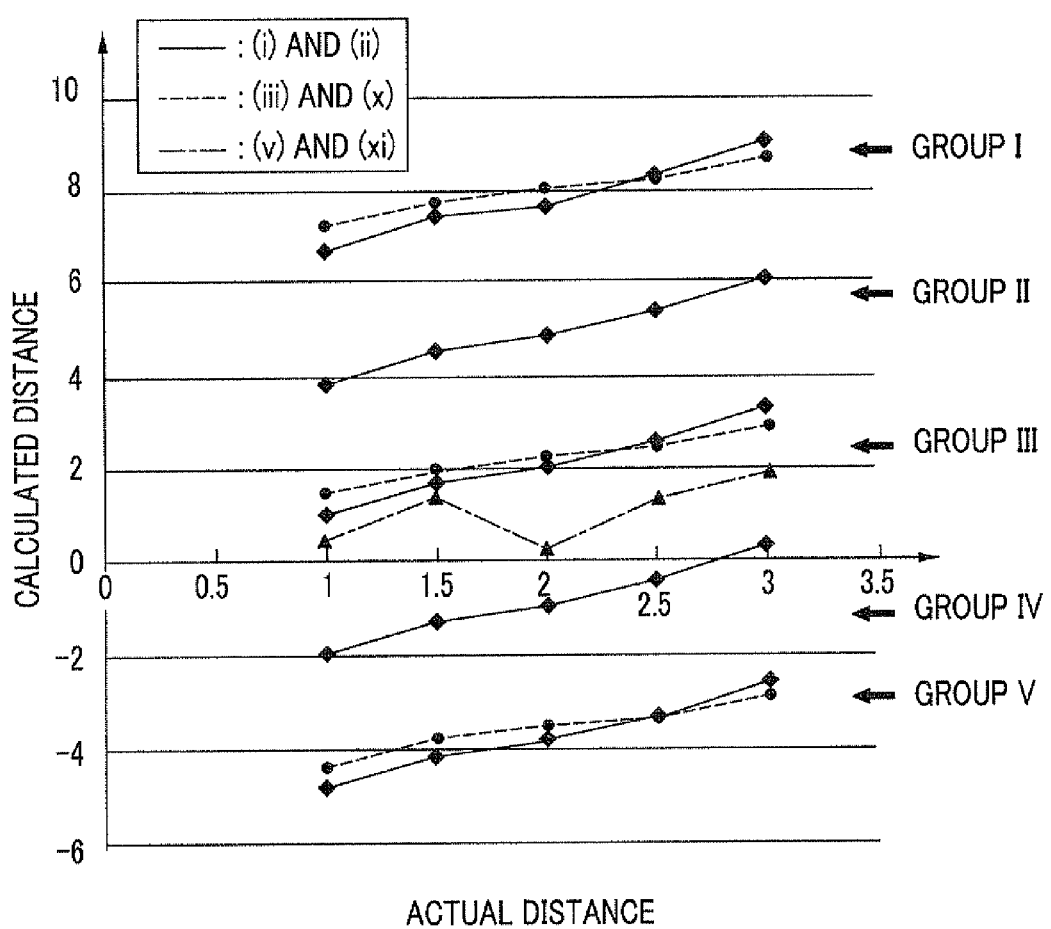
FIG. 14A is a diagram illustrating the calculated periodic solution.
Figure 14B:
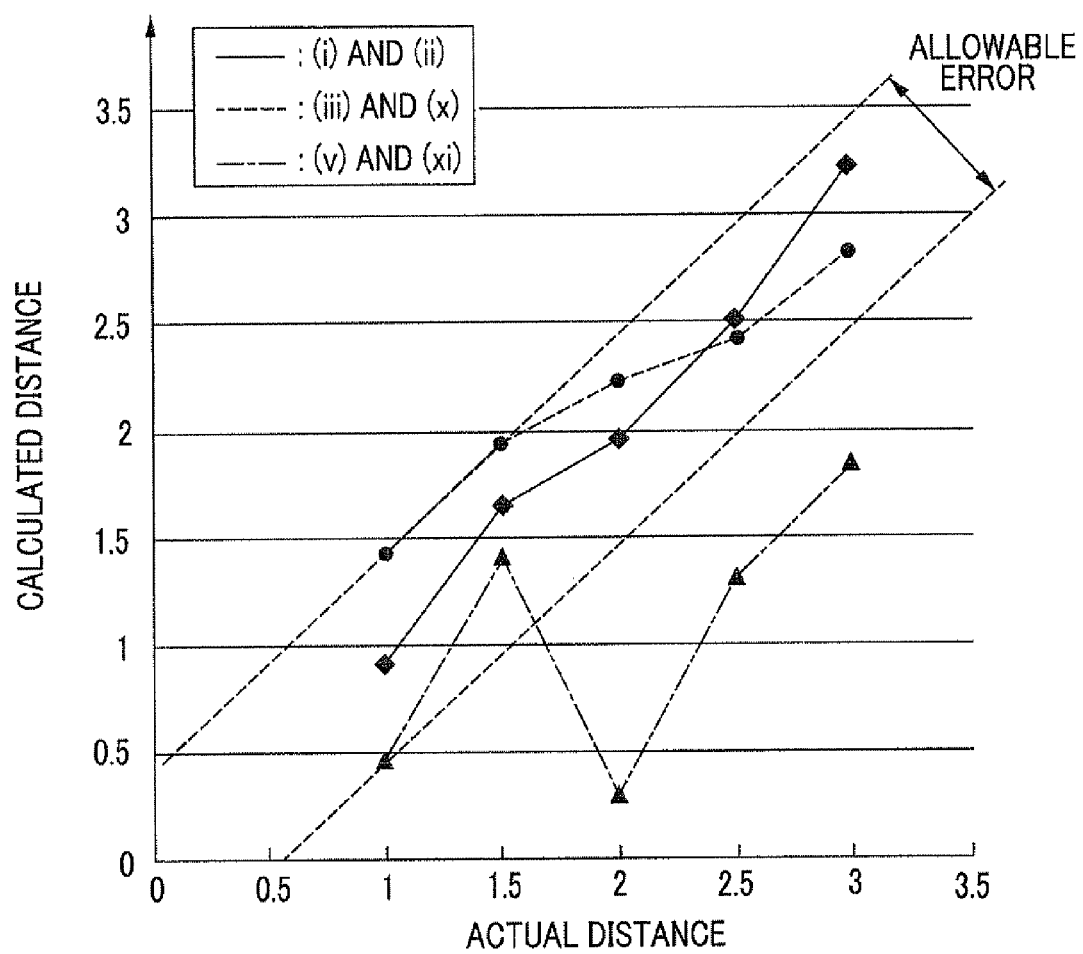
FIG. 14B is a partially enlarged view of FIG. 14A.

In this exemplary embodiment, the following method may be used as the method of selecting the correct solution from the periodic solutions. In this exemplary embodiment, a method different from that shown in FIG. 11 is used to select the frequency from the sound waves of the spoken voice, which makes it easy to select the correct solution from the periodic solutions. FIG. 13 and FIGS. 14A and 14B are diagrams illustrating an example of the method of selecting the correct solution from the periodic solutions. Among the drawings, FIG. 13 is a diagram illustrating a second example in which three or more sound waves with different frequencies are selected from the spoken voice, each of the sound waves with different frequencies is used to calculate plural phase differences between the sound waves. FIG. 14A is a diagram illustrating the periodic solutions calculated in this way. FIG. 14E is a partially enlarged view of FIG. 14A. As shown in FIG. 13, in this exemplary embodiment, three sets of sound waves with frequencies are selected. That is, a set (set 1) of sound waves with frequencies represented by (i) and (ii), a set (set 2) of sound waves with frequencies represented by (iii) and (x), and a set (set 3) of sound waves with frequencies represented by (v) and (xi) are selected. The frequency differences between the three sets are 117 Hz, 19.5 Hz, and 58.6 Hz. Then, the distance between the wearers is calculated for each of the sets.

When the three sets of frequencies are used to calculate the distance between the wearers, as shown in FIG. 14A, the frequency difference for each of the sets is different and the period of the obtained solution is also different. Specifically, in the case of the set of (i) and (ii), the period is 2.9 m. In the case of the set of (iii) and (x), the period is 17.4 m. In the case of the set of (v) and (xi), the period is 5.8 m.

In this exemplary embodiment, a point where three sets of periodic solutions are substantially equal to each other may be considered as the correct solution. That is, in FIG. 14A, among five groups, that is, groups (I) to (V), the group (III) where three sets of periodic solutions are substantially equal to each other is determined to be the correct solution.

FIG. 14B shows the obtained solution and the allowable error at the point which is determined to be the correct solution. The allowable range is ±50 cm from the actual distance. As can be seen from FIG. 14B, only the set of (v) and (xi) is beyond the allowable range. It is considered that this is because the selected frequency difference is too small. When the selected frequency difference is too large, the pitch of the periodic solution is too small and it is difficult to determine the correct solution. Therefore, in this exemplary embodiment, the selected frequency difference is preferable in the range of 10 Hz to 300 Hz and more preferably in the range of 50 Hz to 150 Hz.

In the set of (v) and (xi), there is a large error in the calculated distance. Therefore, it is considered that a value for the set is defined as an "uncertain value" and the correct solution is selected without using the value. As another example in which the "uncertain value" is excluded, there is the following example. In FIG. 14A, in the group (I), the group (III), and the group (V), the periodic solutions of the set of (i) and (ii) and the set of (iii) and (x) are equal to each other. In the group (I) among the groups, the distance for conversation between the wearers is too long and the solution of the group (V) is a negative value and is not the actual value. Therefore, the group (I) and the group (V) may be excluded. Thus, the group (III) may be determined to be the correct solution.

As such, in this exemplary embodiment, plural phase differences with different values are used to exclude the "uncertain value". The provisional distance with high accuracy is selected from the calculated plural provisional distances and is used as the distance between the wearers.

Calculation of Distance Between Wearers-Fourth Exemplary Embodiment

Figure 15:
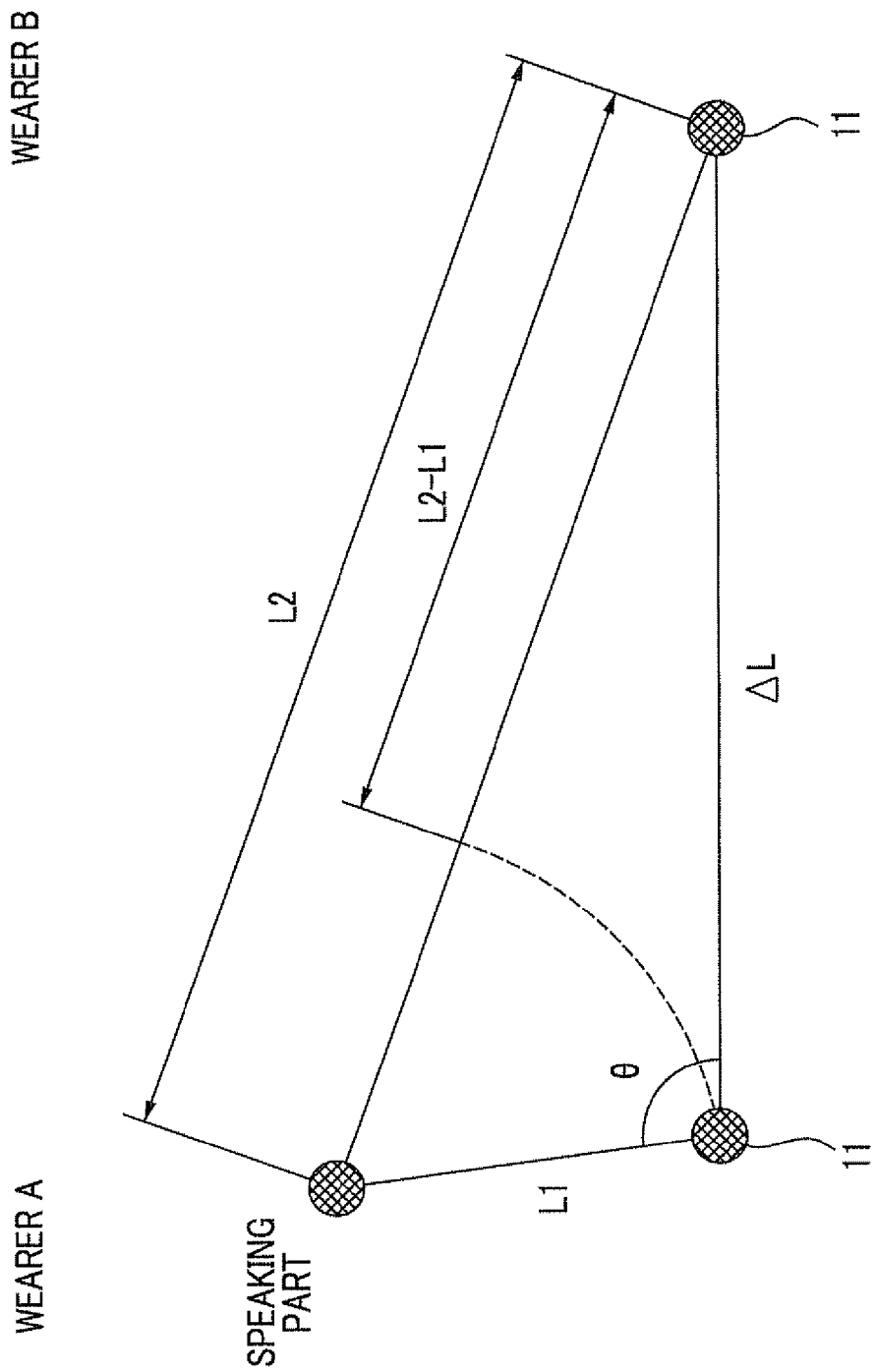
FIG. 15 is a diagram illustrating the relationship between the actually calculated distance and the distance between the terminal devices.

In the above-mentioned example, the distance between the terminal device 10A and the terminal device 10B is measured to calculate the distance between the wearer A and the wearer B. Strictly, the calculated distance is not equal to the distance between the terminal device 10A and the terminal device 10B. FIG. 15 is a diagram illustrating the relationship between the distance between the terminal device 10A and the terminal device 10B and the actually calculated distance. The voice spoken from the mouth (speaking part) of the wearer A propagates a distance L1 and is captured by the microphone 11 of the terminal device 10A of the wearer A. The voice spoken by the wearer A propagates a distance L2 and is captured by the microphone 11 of the terminal device 10B of the wearer B. Therefore, the distance calculated on the basis of the voice spoken by the wearer A which is captured by the microphones 11 is L2−L1. The distance is different from the distance (the distance between the microphones 11) ΔL between the terminal device 10A and the terminal device 10B. However, since there is a small difference between L2−L1 and ΔL, L2−L1≈ΔL is established. In this case, there are few problems.

The following method is considered to correct the difference. First, a triangle formed by connecting the mouth (speaking part) of the wearer A, the microphone 11 of the terminal device 10A, and the microphone 11 of the terminal device 10A is considered. It is assumed that the angle of the microphone 11 of the terminal device 10A is θ in the triangle. In this case, since θ can be approximate to 90°, the following Expression 1 is established:

$$\Delta L = (L2^2 - L1^2)^{1/2}. \quad \text{[Expression 1]}$$

The distance L1 is substantially fixed and may be measured in advance. The distance is added to the calculated distance L2−L1 to calculate L2. L1 and L2 are applied to the above-mentioned Expression 1 to calculate ΔL. ΔL which is calculated by this method may be used as the corrected distance between the wearers.

Description of Program

The process performed by the host device 20 according to this exemplary embodiment described with reference to FIG. 10 is implemented by the cooperation of software and hardware resources. That is, a CPU (not shown) of a control computer provided in the host device 20 executes the program for implementing each function of the host device 20 to implement each function.

The process performed by the host device 20 described with reference to FIG. 10 may be considered as a program that causes a computer to perform a function of acquiring information about the voices acquired by the microphones 11 and 12 which acquire the voice and are worn by the first wearer and the microphones 11 and 12 which acquire the voice and are worn by the second wearer from each of the wearer and a function of calculating the distance between the first wearer and the second wearer on the basis of speaker identification information, which is information for determining whether the voice acquired by the microphone 11 and 12 worn by the first wearer and the voice which is the same as that acquired by the microphone 11 and 12 worn by the first wearer and is acquired by the microphones 11 and 12 worn by the second wearer are spoken by the wearers or other persons, and the phase difference between the sound waves with plural frequencies included in the voices.

EXAMPLES

Next, examples of the invention will be described in detail below. However, the invention is not limited to the examples as long as it does not depart from the scope and spirit thereof.

Evaluation Method

The wearer A and the wearer B wear the terminal device 10A and the terminal device 10B, respectively, and the distance between the wearers is calculated while the distances of the wearer A and the wearer B are changed. Specifically, sound waves with frequencies of 117 Hz and 234 Hz represented by (i) and (ii) in FIG. 11 are used and the phase difference between the sound waves with the two frequencies is used to calculate the distance between the wearer A and the wearer B.

Evaluation Result

Figure 16:
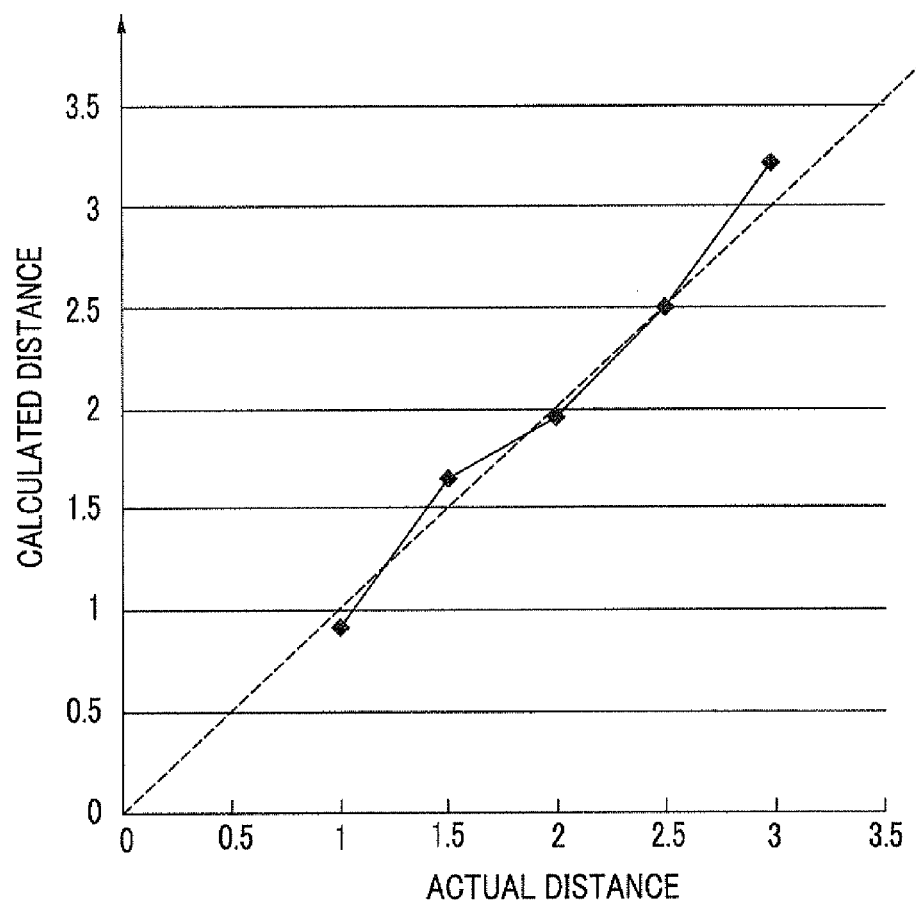
FIG. 16 is a diagram illustrating the result according to an example.

The result is shown in FIG. 16. In FIG. 16, the horizontal axis is the actual distance and the vertical axis is the distance calculated by the above-mentioned method. FIG. 16 shows the relationship between the actual distance and the calculated distance. As can be seen from FIG. 16, it is possible to accurately calculate the distance between the wearer A and the wearer B in the range of 1 m to 3 m. The error of the calculated distance between the wearer A and the wearer B is within 18.2 cm.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A voice analyzer comprising:
   a voice information acquiring unit that acquires information about a voice acquired by a first voice acquiring unit and a second voice acquiring unit,
   the first voice acquiring unit being worn by a first wearer and the second voice acquiring unit being worn by a second wearer, and the first voice acquiring unit having a first microphone and a second microphone, the first microphone being positioned closer to a mouth of the first wearer than the second microphone; and a distance calculation unit that calculates a distance between the first wearer and the second wearer based on:
(a) speaker identification information, which is information for determining whether the voice is spoken by the first wearer, the second wearer or another person, wherein
when a sound pressure ratio of the first microphone to the second microphone is greater than a threshold value, the voice is determined to be a voice of the first wearer, and
when the sound pressure ratio is less than the threshold value, the voice is determined to be a voice of the second wearer or another person, and
(b) a phase difference between sound waves with a plurality of frequencies included in the voice acquired by the first voice acquiring unit and the second voice acquiring unit, the sound waves including a first sound wave included in the voice of the first wearer and a second sound wave included in the voice of the second wearer,
the distance calculation unit calculating the distance when a voice of the second wearer is substantially synchronized with an on and off timing of a voice of the first wearer.

2. The voice analyzer according to claim 1,
wherein the distance calculation unit calculates the distance between the first wearer and the second wearer by using the phase difference as a phase signal.

3. The voice analyzer according to claim 1,
wherein the distance calculation unit calculates provisional distances between the first wearer and the second wearer on the basis of a plurality of phase differences and uses an average of the plurality of provisional distances as the distance between the first wearer and the second wearer.

4. The voice analyzer according to claim 2,
wherein the distance calculation unit calculates provisional distances between the first wearer and the second wearer on the basis of a plurality of phase differences and uses an average of the plurality of provisional distances as the distance between the first wearer and the second wearer.

5. The voice analyzer according to claim 1,
wherein the distance calculation unit calculates provisional distances between the first wearer and the second wearer on the basis of a plurality of phase differences, selects the provisional distance with the highest accuracy among the plurality of provisional distances, and uses the selected provisional distance as the distance between the first wearer and the second wearer.

6. The voice analyzer according to claim 2,
wherein the distance calculation unit calculates provisional distances between the first wearer and the second wearer on the basis of a plurality of phase differences, selects the provisional distance with the highest accuracy among the plurality of provisional distances, and uses the selected provisional distance as the distance between the first wearer and the second wearer.

7. The voice analyzer according to claim 3,
wherein the distance calculation unit calculates provisional distances between the first wearer and the second wearer on the basis of a plurality of phase differences, selects the provisional distance with the highest accuracy among the plurality of provisional distances, and uses the selected provisional distance as the distance between the first wearer and the second wearer.

8. The voice analyzer according to claim 4,
wherein the distance calculation unit calculates provisional distances between the first wearer and the second wearer on the basis of a plurality of phase differences, selects the provisional distance with the highest accuracy among the plurality of provisional distances, and uses the selected provisional distance as the distance between the first wearer and the second wearer.

9. A voice analyzer comprising:
a voice acquiring unit that acquires a voice and is worn by a wearer,
the voice acquiring unit having a first microphone and a second microphone, the first microphone being positioned closer to a mouth of the wearer than the second microphone;
a speaker identification unit that determines whether the voice acquired by the voice acquiring unit is spoken by the wearer or another person, wherein
when a sound pressure ratio of the first microphone to the second microphone is greater than a threshold value, the voice is determined to be a voice of the wearer, and
when the sound pressure ratio is less than the threshold value, the voice is determined to be a voice of the other person;
a phase difference calculation unit that calculates a phase difference between sound waves with a plurality of frequencies which are included in the voice acquired by the voice acquiring unit, the second waves including a first sound wave included in the voice of the wearer and a second sound wave included in the voice of the other person;
a voice information transmitting unit that transmits information about the voice including speaker identification information from the speaker identification unit and information about the phase difference calculated by the phase difference calculation unit; and
a distance calculation unit that calculates a distance between the wearer and the other person based on the speaker identification information and the phase difference,
the distance calculation unit calculating the distance when a voice of the other person is substantially synchronized with an on and off timing of a voice of the wearer.

10. A voice analysis system comprising:
a first voice acquiring unit that acquires a voice and is worn by a first wearer, the first voice acquiring unit having a first microphone and a second microphone, the first microphone being positioned closer to a mouth of the first wearer than the second microphone;
a second voice acquiring unit that acquires the voice and is worn by a second wearer; and
a distance calculation unit that calculates a distance between the first wearer and the second wearer based on:
(a) speaker identification information, which is information for determining whether the voice is spoken by the first wearer, the second wearer or a person other than the first wearer, wherein
when a sound pressure ratio of the first microphone to the second microphone is greater than a threshold value, the voice is determined to be a voice of the wearers, and
when the sound pressure ratio is less than the threshold value, the voice is determined to be a voice of the person other than the first wearer, and (b) a phase difference between sound waves with a plurality of frequencies included in the voice acquired by the first voice acquiring unit and the second voice acquiring unit, the sound waves including a first sound wave included in the voice of the first wearer and a second sound wave included in the voice of the second wearer, the distance calculation unit calculating the distance when a voice of the second wearer is substantially synchronized with an on and off timing of a voice of the first wearer.

11. A non-transitory computer readable medium storing a program that causes a computer to implement the functions of:

acquiring information about a voice acquired by a first voice acquiring unit and a second voice acquiring unit, the first voice acquiring unit being worn by a first wearer and the second voice acquiring unit being worn by a second wearer, and the first voice acquiring unit having a first microphone and a second microphone, the first microphone being positioned closer to a mouth of the first wearer than the second microphone; and when a voice of the second wearer is substantially synchronized with an on and off timing of a voice of the first wearer, calculating a distance between the first wearer and the second wearer based on:

(a) speaker identification information, which is information for determining whether the voice is spoken by the first wearer, the second wearer or another person, wherein when a sound pressure ratio of the first microphone to the second microphone is greater than a threshold value, the voice is determined to be a voice of the first wearer, and when the sound pressure ratio is less than the threshold value, the voice is determined to be a voice of the second wearer or another person, and (b) a phase difference between sound waves with a plurality of frequencies included in the voice acquired by the first voice acquiring unit and the second voice acquiring unit, the sound waves including a first sound wave included in the voice of the first wearer and a second sound wave included un the voice if the second wearer.

12. The voice analyzer according to claim 1 the second voice acquiring unit having a third microphone and a fourth microphone, the third microphone and the fourth microphone being positioned at different distances from the mouth of the second wearer, wherein when a sound pressure ratio of the third microphone to the fourth microphone is greater than a threshold value, the voice is determined to be the second wearer, and when the sound pressure ratio is less than the threshold value, the voice is determined to be a voice of a person other than the second wearer.

13. The voice analyzer according to claim 12, wherein the first microphone is arranged at a position that is about 30 cm to about 40 cm away from the mouth of the first wearer, the second microphone is arranged at a position that is about 10 cm to about 20 cm away from the mouth of the first wearer, the third microphone is arranged at a position that is about 30 cm to about 40 com away from the mouth of the second wearer, and the fourth microphone is arranged at a position that is about 10 cm to about 20 cm away from the mouth of the second wearer.

14. The voice analyzer according to claim 5, wherein a frequency difference between the sound waves is in the range of 10 Hz to 300 Hz.

15. The voice analyzer according to claim 1, wherein the first microphone and the second microphone are provided in a carrying strap, and the carrying strap is configured to be worn around a neck of the first wearer.

16. The voice analyzer according to claim 1, wherein the distance between the second microphone and the mouth of the first wearer is about 1.5 to 4 times more than the distance between the first microphone and the mouth of the first wearer.

* * * * *